United States Patent [19]
Campbell

[11] Patent Number: 6,131,954
[45] Date of Patent: Oct. 17, 2000

[54] WELDABLE COUPLE FOR ELECTROFUSION COUPLING OF PROFILE WALL THERMOPLASTIC PIPES WITHOUT A SEPARATE COUPLER

[76] Inventor: Steve Campbell, 4501 Lindell, Unit 11D/E, St. Louis, Mo. 63108

[21] Appl. No.: 09/134,412

[22] Filed: Aug. 13, 1998

Related U.S. Application Data

[63] Continuation-in-part of application No. 08/654,104, May 28, 1996, Pat. No. 5,820,720.

[51] Int. Cl.$^7$ ........................................... F16L 13/02
[52] U.S. Cl. ..................... 285/21.1; 285/21.2; 285/332; 285/423
[58] Field of Search .................. 285/21.1, 21.2, 285/21.3, 22, 330, 332, 331, 915, 7, 423, 123.1, 123.15, FOR 13, FOR 120; 219/535, 538, 552; 156/273.9, 347.7, 274.2, 379.7; 138/109

[56] References Cited

U.S. PATENT DOCUMENTS

| | | |
|---|---|---|
| 2,741,402 | 4/1956 | Sayre . |
| 2,785,910 | 3/1957 | Munger . |
| 3,061,503 | 10/1962 | Gould et al. . |
| 3,095,112 | 6/1963 | Weinstein et al. . |
| 3,422,179 | 1/1969 | Bauer et al. . |
| 3,768,841 | 10/1973 | Byrne et al. . |
| 3,961,814 | 6/1976 | Byrne et al. . |
| 4,090,899 | 5/1978 | Reich . |
| 4,176,274 | 11/1979 | Lippera . |
| 4,274,662 | 6/1981 | de Groot et al. . |
| 4,341,392 | 7/1982 | Dongeren ................................ 138/109 |
| 4,365,144 | 12/1982 | Reich et al. . |
| 4,526,410 | 7/1985 | Vohrer . |

(List continued on next page.)

FOREIGN PATENT DOCUMENTS

| | | |
|---|---|---|
| 0 416 317 A2 | 10/1990 | European Pat. Off. . |
| 3720577 A1 | 4/1988 | Germany . |
| 42 21 454 A1 | 3/1994 | Germany . |
| 423 209 | 10/1963 | Switzerland . |

OTHER PUBLICATIONS

"Industrial Catalog" by Central Plastics Company, 1901 W. Independence, Shawnee, Oklahoma USA, 74802–3129, pp. 1–24.

"We're Not Just Another Pipe Company We're The Polyethylene Pipe Advantage" by Poly Systems Incorporated, Route 1, Box 486, Steelville, Missouri 65565.

"Liners Give Rusted Culverts New Life, Higher Capacity" by *Roads & Bridges*, Feb., 1994, p. 42.

"Permacore" by Phillips Driscopipe, Inc. (a subsidiary of Phillips 66 Company), 1990, pp. 1–12.

*Primary Examiner*—Dave W. Arola
*Attorney, Agent, or Firm*—Howell & Haferkamp, L.C.

[57] ABSTRACT

A method and apparatus are disclosed for a thermoplastic profile wall pipe joint or weld assembly without the use of a coupler to provide for a leak free pipe joint with substantially flush interior and exterior surfaces. The pipe joint consists of configuring the two pipe ends to be joined by removing substantially all of a first wall and the helical rib from the first pipe end, removing a portion of the helical rib from the second pipe end, coupling the pipe ends together and heating the weld assembly couple to fusion weld the pipe ends together. An electrical resistance element is provided for and placed within the pipe joint to provide the required heat. Also disclosed is the use of a thermoplastic sheet with the electrical resistance element to allow the end margins of the electrical resistance element to overlap without shorting by separating the end margins radially from one another and to allow for a more uniform fusion welded pipe joint. The resulting joint is a leak free joint with no interior flow obstructions or exterior collars or protrusions without the need for a coupler.

20 Claims, 9 Drawing Sheets

U.S. PATENT DOCUMENTS

| | | |
|---|---|---|
| 4,530,520 | 7/1985 | Nyffeler et al. . |
| 4,530,521 | 7/1985 | Nyffeler et al. . |
| 4,649,641 | 3/1987 | Sichler . |
| 4,770,442 | 9/1988 | Sichler . |
| 4,865,674 | 9/1989 | Durkin . |
| 4,906,313 | 3/1990 | Hill . |
| 4,919,461 | 4/1990 | Reynolds . |
| 5,096,528 | 3/1992 | Durrenberger et al. ............. 285/423 |
| 5,099,888 | 3/1992 | Valls ................................. 138/109 |
| 5,150,922 | 9/1992 | Nakashiba et al. . |
| 5,328,210 | 7/1994 | Stafford et al. . |
| 5,336,351 | 8/1994 | Meyers . |
| 5,362,112 | 11/1994 | Hamilton et al. ..................... 285/910 |
| 5,362,114 | 11/1994 | Levingston . |
| 5,366,253 | 11/1994 | Nakashiba et al. . |
| 5,375,889 | 12/1994 | Nakashiba et al. . |
| 5,407,514 | 4/1995 | Butts et al. . |
| 5,407,520 | 4/1995 | Butts et al. . |
| 5,410,131 | 4/1995 | Brunet et al. . |
| 5,433,484 | 7/1995 | Ewen et al. . |
| 5,462,314 | 10/1995 | Goto et al. . |
| 5,494,318 | 2/1996 | Butts et al. . |

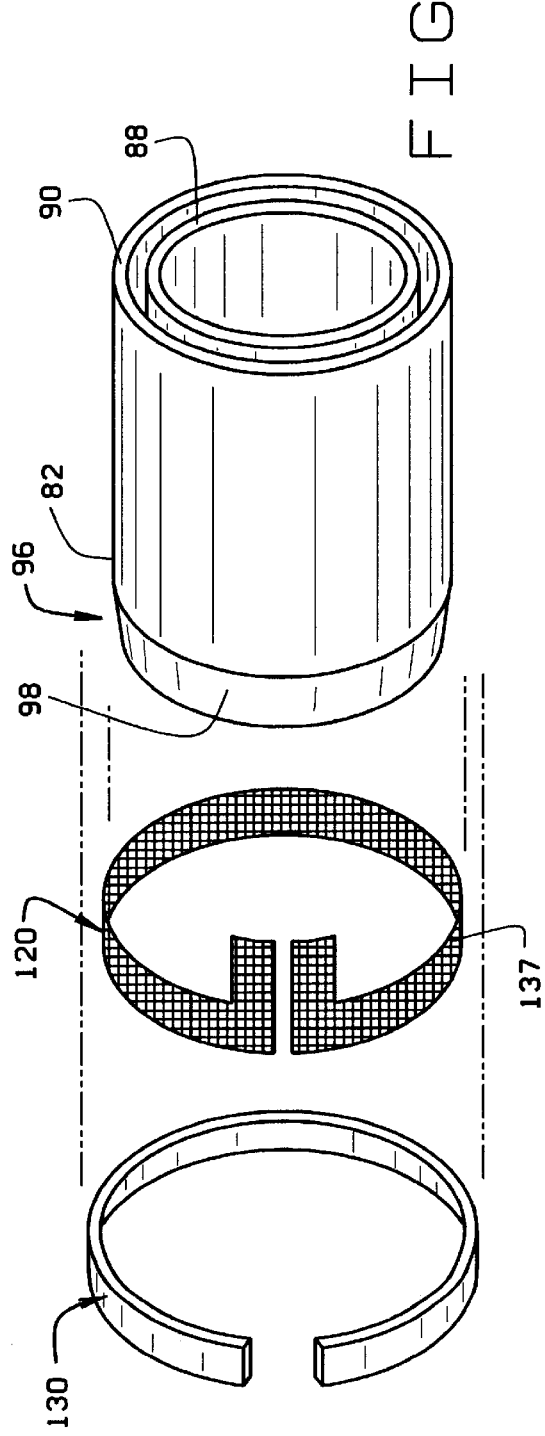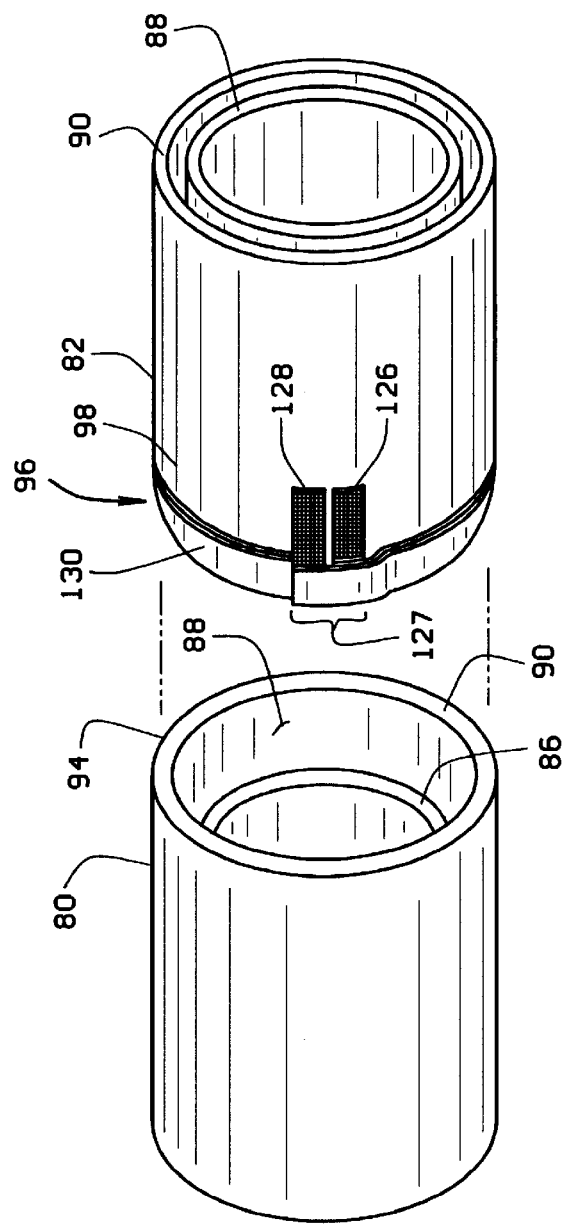

WELDABLE COUPLE FOR ELECTROFUSION COUPLING OF PROFILE WALL THERMOPLASTIC PIPES WITHOUT A SEPARATE COUPLER

CROSS REFERENCE TO RELATED APPLICATION

This application is a continuation-in-part of Ser. No. 08/654,104 filed on May 28, 1996 currently now U.S. Pat. No. 5,820,720; the disclosure of which is incorporated herein by reference.

FIELD OF THE INVENTION

This invention relates generally to the electrofusion welding of profile wall pipes made from thermoplastic materials including polyethylene, polyvinyl chloride, nylons, polybutylene, polypropylene and the like. Specifically, this invention relates to electrofusion welding of such pipes to result in a joint that has substantially flush interior and exterior surfaces and provides constant inside and outside diameters and without the need for a coupler.

BACKGROUND OF THE INVENTION

This invention, as was the parent, pertains to the joining of profile wall thermoplastic pipes including polyolefin, polyethylene, polyvinyl chloride, nylon, polybutylene, polypropylene and the like. These types of materials are gaining popularity in water, sewer, culverts and industrial piping because of their characteristics of being lightweight, corrosion resistance, strong and durable.

"Trenchless" rehabilitation of culverts, storm sewers, sanitary sewers and other underground pipes, by "slip lining" or "insert renewal" with thermoplastic pipes is gaining popularity and growing rapidly throughout the United States and other countries. In this process, a thermoplastic pipe or liner is inserted into an existing pipe or culvert without removal of the deteriorated pipe. The replacement pipe is pushed into or pulled through the existing culvert. In many cases, an existing pipeline can be rehabilitated for a fraction of the cost of replacement and with minimal inconvenience to the public.

Thermoplastic pipes, including polyethylene, are the preferred pipe material for many rehabilitation projects because of the price and the above-noted characteristics. Generally, thermoplastic pipe is manufactured in lengths that are sufficiently short to permit transportation and handling. In the field, where the pipe is to be installed, the short pipe sections must be connected to form a continuous pipe of a predetermined length appropriate for the application.

The joining or connecting of thermoplastic pipes can present many problems because of the variety of field conditions encountered and because of thermoplastic pipes chemical resistance, which, in many cases, makes such pipes impervious to glues or cements. Also, some thermoplastic pipes have a tendency to "creep," or move, when subjected to changing temperatures. Because most applications include exposure to such temperature changes, such movement or "creeping" limits the ability to use mechanical type joints such as threads.

In general, several methods exist to join thermoplastic pipe in the field. A first method is "butt fusion" as it is known in the art. This method involves the use of a butt fusion machine that includes line up equipment and a heat plate. The ends of two pipes to be joined are inserted into the line up equipment that aligns and advances the pipe ends toward one another as necessary. The two pipe ends are pressed against a heat plate that heats and softens the two pipe ends. The heat plate is then removed and the line up equipment advances the two pipes toward one another at a predetermined rate (depending on the size and thickness of the pipe walls) in order to fuse the pipe ends together. This type of butt fusion requires special fusion equipment that is expensive and not always available in the field and cannot be used with certain types of pipe.

Another method known in the art is the use of electrofusion collars or inserts. One type of electrofusion collar is shown in U.S. Pat. No. 4,530,521 to Nyffeler, et al. One type of electrofusion insert is shown in U.S. Pat. No. 3,768,841 to Byrne at al. These devices, as shown in the references, use a sleeve, collar or insert made of thermoplastic material and which either fits over or into the two pipes to be joined. The pipes, and the collar or insert are first heated to soften the thermoplastic material. If using a collar, the pipe ends are inserted into the collar and are thereby joined. If using an insert, the insert is inserted into each pipe end thereby joining the pipes. The heating can be performed with fusion equipment or the collar or insert can contain an electrical resistance element to provide the necessary heat to cause electrofusion welding of the pipes to the collar or insert.

These devices have various disadvantages, including the creation of interior obstructions or exterior protrusions that are not acceptable in many applications. For example, because the collar must be large enough to accept insertion of the pipe ends, the resulting joint does not have a flush exterior. Also, because the insert reduces the inside diameter of the pipes at the joint, the insert acts as an obstruction of flow through the pipe. This is unacceptable in most applications, including most trenchiess rehabilitation projects, because interior flow obstruction is not acceptable. Furthermore, exterior collars impede insertion of the replacement of the pipe during slip lining, as known in the art, and require the use of smaller diameter replacement pipes so that the collar can fit over the pipe and the entire coupling can still fit inside the existing pipe or culvert.

Another method of joining thermoplastic pipes is electrofusion rods or mesh as shown in U.S. Pat. No. 5,410,131 to Brunet et al. Although this device requires no collar or insert, the application requires substantial end pressure to join the two pipe ends. Such pressure is usually supplied by special line up equipment due to the weight of the pipes and this equipment is expensive and not always available or practical for use in field conditions.

Another method, hot air gun welding uses a welding rod of thermoplastic material fed through the nozzle of a hot air gun. The hot air gun applies heat to the ends of the pipe to be welded and melts the welding rod which is applied to a bevel cut between the two ends of the pipe to be joined. Line up equipment must be used, as with the butt fusion methods, and this method has not proven satisfactory in field conditions due to a lack of uniformity in the welding process.

As thermoplastic resin prices increase, plastic pipe manufacturers are constantly looking for manufacturing methods to make pipe lighter without losing physical strength. One type of thermoplastic pipe developed to address these concerns and is gaining popularity is "profile wall pipe" as it is known in the art. An example of this type of pipe is shown in U.S. Pat. No. 5,362,114 to Levingston. Profile wall pipe is thermoplastic pipe formed by extrusion to have an inner cylindrical wall, a generally concentric outer cylindrical wall and a helical rib between and connecting the inner wall and outer wall.

Profile wall pipe is lighter than solid pipe and is created with less material thereby reducing resin costs, but it maintains a high degree of strength. Because it is lighter than solid wall it generally has a competitive advantage over solid wall plastic pipe. For these and other reasons, profile wall pipe is popular in the industry. Unfortunately, typical methods of fusing thennoplastic pipe are unacceptable and do not work on profile wall pipe. This is due, in part because of the configuration of the end walls of such pipe which do not present a solid annular surface due to the presence of the helical rib contained in the pipe. Instead, the end walls of profile wall pipe comprise a thin inner wall, a thin outer wall and a apace between the inner and outer walls formed by the helical rib.

For example, butt fusion is very difficult on profile wall pipe because the pipe ends of profile wall pipe are not solid. The profile wall pipe ends have a thin inner wall, a thin outer wall and a "profile space"—between the inner and outer walls—the depth of which is equal to the distance between the end of the pipe and the helical rib which connects the inner and outer walls. The same problems that exist in joining solid wall thermoplastic pipes are multiplied in profile wall pipes because of their relatively thin inner and outer walls with a large profile space between the walls.

For example one manufacturer produces a polyethylene 10" inch inside diameter profile wall pipe that has inner and outer wall thicknesses of 0.065" inches to 0.079" inches. This particular pipe has a profile distance over 1 inch between the inner and outer walls with an outside diameter of up to approximately 11.20" inches. A 36" inch inside diameter profile wall pipe from the same manufacturer has inner and outer wall thicknesses of approximately 0.195" to 0.228" inches and an outside diameter of approximately 40.65" inches giving a profile distance between the inner and outer walls over 4 inches.

Butt fusion of profile wall pipes is very difficult due to the thin wall thickness compared to the overall diameter. Setting the correct hydraulic pressure on a butt fusion machine for such thin walls and large diameters would result in extremely slow fusion machine carriage movement and potential cooling of the thermoplastic prior to fusion joining. This results in a failed weld or "cold joint" as known in the art. Rods or mesh alone also will not work on profile wall pipe because profile wall pipe does not have solid flat pipe end surfaces which are required in those methods.

For example, U.S. Pat. No. 5,494,318 Butts et al. discloses a secondary containment piping system composed of a plurality of modules of concentric pipe. However, the invention of Butts would not work with profile wall pipe because when joining concentric pipes together using the apparatus of Butts, one must use line-up equipment. Dual containment pipe, unlike profile wall pipe is essentially two separate thermoplastic wall pipes with walls of sufficient thickness that butt fusion is a readily acceptable means of joining. In addition, as disclosed in Butts, a welding rod is placed between the solid ends of the pipe members to be joined, pressure is applied and maintained while an electric current is passed through the wires causing the melting of the core of the welding rod and the adjacent portions of the members. The pressure is maintained after the current is discontinued until the members are fused together. Column 1, lines 35–45. Specifically, Butts discloses positioning an annulus of welding rod between the ends to be joined and butting the ends together with the appropriate maintenance of pressure while an electric current is supplied for a sufficient time to cause fusion of the members and the welding rod. This will simply not work in profile wall pipe for the reasons stated above. Moreover, in order for this type of pipe fusion to work, the wall thickness of the inner and outer walls would have to be increased to such an extent that the advantages of using profile wall pipe are lost. Increased material and weight of the pipes reduces the effect of using profile wall pipe. Also, dual containment pipe is to satisfactory for the applications for which profile wall pipe is usually used for the reasons noted above.

Butts also discloses the use of a "fusion ring" for coupling sections of dual containment pipe. However, Butts requires the use of a welding rod element internally within the fusion ring with the ends of the pipe being received in opposite sides of the ring and held in position while the welding rod is heated and fuses with the ends of the pipe to form the complete joint. The fusion ring is formed of a welding rod and a collar surrounding the welding rod, the collar having an inner inside diameter substantially equal to the outside diameter of the sections to be joined. The fusion ring is positioned between two sections of pipe as in a socket fitting and the two sections are then welded together while pressure is applied to push the pipes together.

This fusion ring of Butts et al. is not acceptable for profile wall pipe and it continues to cause interior and exterior protrusions which can impede flow and impede the use of the pipe as replacement culvert systems. Moreover, profile wall pipe is different from dual containment pipe and does not have the advantages of profile wall pipe. Dual containment pipe is essentially two solid wall pipes concentric with one another. Thus, those applications that work with solid wall pipe will work with dual containment pipe but not with profile wall pipe. Therefore, the invention disclosed in Butts would not be applicable to nor functional with profile wall pipe to obtain the advantages provided by the present invention.

For example, profile wall pipe, unlike dual containment pipe, is not two separate concentric pipes. In fact, profile wall pipe is a single pipe, which, as explained above, is extruded and used for its lightweight replacement capabilities. However, the inner and outer walls of the profile wall pipe are so thin that the welding rod of Butts would not work on profile wall pipe and, for the reasons discussed above, one cannot butt fuse profile wall pipe due to the complexity of the process and the length of time and pressure that would be required to cause the pieces of pipe to fuse together. Moreover, in order to prevent protrusion of the welding rod into and out of the pipe so as to maintain flush surfaces, one would be required to use such a thin welding rod that it would not be sufficient to carry enough current and make a sufficiently consistent weld.

Another method, hot gas welding, when used with profile wall pipes will not achieve a strong, uniform joint even with the most experienced welders. Prior art electrofusion collars or inserts would be very bulky and either seriously interrupt interior flows or have a very large collar on the outside of the pipe, making the pipe joint unsuitable for slip lining or pipe rehabilitation applications.

One method for joining profile wall pipes is shown in U.S. Pat. No. 5,362,114 to Levingston. As shown therein, profile wall pipe is joined by threaded engagement. Shaving reveals the threads, formed by the helical rib during creation of the pipe, along the inner wall of one pipe section and the outer wall of another pipe section. This allows the two pipe sections to be threaded together. However, this method of joining is not sealed and requires the use of sealants or gaskets to make the joint liquid tight or leak-proof and does not provide the beneficial characteristics of a fusion welded joint. For example, a fusion weld is also air tight whereas a threaded joint, even with sealants, is not acceptable for gas pipelines which require airtight seals.

Thus, prior art collars or inserts result in interior flow obstructions and or collars or exterior protrusions which would prevent the pipe insertion in trenchless applications. Prior art welding rods or mesh require line up equipment to push the ends of the pipes together in solid wall pipe and would not be acceptable for the joining of profile wall pipes. Prior art threaded methods for joining profile wall pipes are not leak proof without sealants or gaskets. Furthermore, specifications in many applications call for a leak-proof joint that has a flush interior and exterior pipe surface and in trenchiess applications is strong enough to withstand pulling or pushing the pipe through an existing pipeline. The above type methods do not satisfy these specifications.

SUMMARY OF THE INVENTION

The invention herein, as the invention of the parent, results in a uniform, strong, leak-proof joint with no inner or outer obstructions, making it suitable for trenchless, slip line applications, in addition to direct burial applications. Both the parent and present inventions require no fusion machine, or special line-up equipment to apply end pressure. The present invention, like the parent, also uses an electrical resistance screen element which is an improvement over resistance wires in both cost and the uniform heat distribution a screen provides. Although the parent invention was a great improvement over the prior art, and is beneficial in many applications, the inventor herein has further improved the invention of the parent. The present invention provides for a solid pipe joint or coupling having substantially flush interior and exterior surfaces even without the use of a coupler on profile wall pipe for those applications where a coupler is not desired. Building on the invention disclosed in the parent, the inventor herein has improved his early method and apparatus for electrofusion coupling of thermoplastic pipe by providing an additional method and apparatus for joining of profile wall pipes. As discussed in the parent, a profile wall pipe comprises an inner wall, an outer wall and a helical rib joining the two together. Profile wall pipe does not lend itself to the usual bonding methods of solid wall thermoplastic pipe due to the thin inner and outer walls.

The present invention comprises removing substantially all of either the inner or outer wall, and substantially all of the helical rib, for a predetermined distance from an end of the first pipe to be joined, thereby leaving the first pipe end with only a single wall for the predetermined distance. The wall removed from the first pipe end may be either the inner wall or the outer wall depending on which embodiment of the invention is to be practiced. In both embodiments, a portion of the helical rib is removed for a predetermined distance from an end of the second pipe to be joined for a predetermined distance, leaving the inner and outer walls substantially intact. By removing substantially all of the helical rib immediately adjacent to the second pipe end and decreasing the amount of the helical rib removed as the distance from the second pipe end increases, the inner and outer walls at the second pipe end become more flexible at the second pipe end. This allows the interior circumference at the second pipe end to be increased or the exterior circumference at the second pipe end to be decreased, thereby allowing the second pipe end to be coupled to the first pipe end.

In a first embodiment of the present invention, substantially all of the inner wall and helical rib are removed from the first pipe end. The second pipe end is then coupled to the first pipe end by positioning the second pipe end (having a portion of helical rib removed therefrom) into the first pipe end (having substantially only the outer wall remaining) thereby providing a coupling having substantially flush interior and exterior surfaces. In a second embodiment of the invention, substantially all of the outer wall and helical rib are removed from the first pipe, the second pipe end is coupled to the first pipe end by positioning the first pipe end (having substantially only the inner wall remaining) within the second pipe end (having a portion of helical rib removed therefrom) thereby providing a coupling having substantially flush interior and exterior surfaces. In the first embodiment, corresponding surfaces of the outer walls of the two pipe ends are mated together to form the coupling. In the second embodiment, opposing surfaces of the two outer walls of the two pipe ends are mated together to form the coupling.

Once coupled together, in order to cause the two pipe ends to fuse together, a stainless steel screen, as disclosed in the parent application, is used in the present invention as an electrical resistance element which is positioned within the coupling to provide means for fusion welding the pipe ends together. The element is disposed on the mating appropriate surface of one of the pipes, depending on which embodiment of the invention is used, and energized after joining the pipes together to provide the heat necessary to fusion weld the pipe ends together forming a weld assembly.

The invention of the parent disclosed the use of a single continuous piece of stainless steel or other suitable electrically conductive material as an electrical resistance element. The advantage of a one-piece screen versus a helical heating coil or mesh is a complete coverage of the required heating area without the potential to short out due to movement of the wire or loss of insulation on the mesh. This method in production may be considerably less expensive that other resistance heating methods.

The method of preventing shorting in the parent when using the single continuous piece of stainless steel screen or other metal screen as an electrical resistance element was to adapt the ends of the electrical resistance element so that they could overlap while being wrapped around the circumference of the pipe without shorting. Building on the invention disclosed in the parent, the inventor herein has improved his earlier invention by separating the two ends of the electrical resistance element with a thin piece of thermoplastic material. This prevents an electrical short between the element ends by separating the element ends radially with a piece of nonconductive material therebetween. In the preferred embodiment of the present invention, the sheet of thermoplastic material is of the same material as the pipes and enhances both the coupling process and the fusion welding of the pipe joint. Although only a portion of thermoplastic sheet is needed, between the areas of overlap of the element ends, to prevent a short, the inventor has found that by using a thermoplastic sheet disposed around the entire length of the electrical resistance element, in addition to preventing electrical shorting, the coupling of the pipe ends is enhanced, made easier and that this results in an enhanced bond at the weld assembly.

For example, instead of shaping the two ends of the electrical resistance element to allow overlap without touching, the present invention provides for an electrical resistance element having a length which is greater than the circumference of the pipe which it is to be wrapped around. In use, the electrical resistance element is wrapped around the pipe and a thin sheet of polyethylene is placed between the two ends thereby insulating the two ends and avoiding an electrical short. When the electrical resistance element is energized, the entire screen element causes the surrounding thermoplastic pipe and polyethylene sheet to heat up and melt, increasing the amount of thermoplastic material available to form the bond, and also causes the pipes to be fused together without causing an electrical short.

While the principal advantages and features of the invention have been described above, a greater understanding of the invention may be attained by referring to the drawings and the description of the preferred embodiment which follow.

BRIEF DESCRIPTION OF THE DRAWINGS

FIG. 26 shows an exploded perspective view of a profile wall pipe, an electrical resistance element and a thermoplastic sheet prior in accordance with the present invention.

FIG. 27 shows two profile wall pipes configured in accordance with the terms of the present invention, prior to being joined, with an electrical resistance element and a thermoplastic sheet wrapped around an end of one of the pipes.

DETAILED DESCRIPTION OF THE PREFERRED EMBODIMENTS

Figure 1:
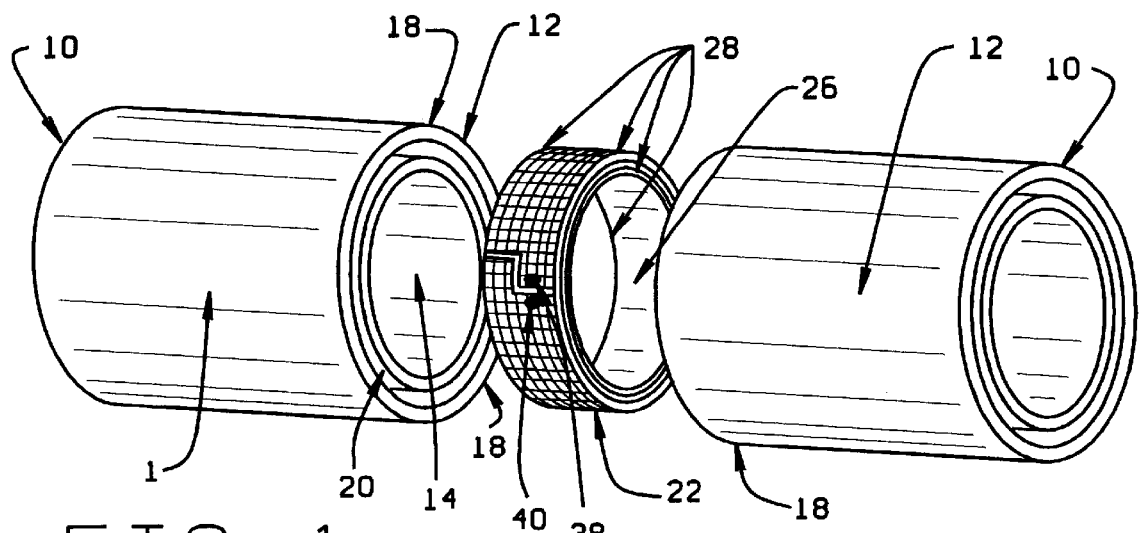
FIG. 1 is an exploded perspective view of two square profile wall pipes showing the coupler between the two pipes prior to being joined.

The invention of the parent invention is shown in FIG. 1. Identical profile wall pipes 10 are shown. Because the pipes are identical, only one pipe will be described in detail, however, it is understood that the detailed description of the pipe in this embodiment of the parent applies equally to each pipe unless otherwise specified. Profile wall pipes 10 comprise a generally cylindrical outer wall 12, a cylindrical inner wall 14 substantially concentric with outer wall 12 and a helical rib 16 located generally between the walls 12 and 14 and joining the walls 12 and 14 together. The convolutions of the rib 16 extend in multiple turns around the exterior of the inner wall 14 and along the interior of the outer wall 12 for substantially the entire length of each pipe 10. Rib 16 advances incrementally along the longitudinal axis of pipe 10 as it winds around pipe 10 and thereby forms a profile space 11 between each wind of the rib 16 around the pipe 10. Both outer wall 12 and inner wall 14 terminate at an end wall 18.

Profile wall pipe is polyethylene pipe 10 manufactured by extrusion so that each length of pipe is one integral piece of material. Outer wall 12, inner wall 14 and rib 16 all extend the full length of pipe 10. Outer wall 12 and inner wall 14 have relatively smooth surfaces and terminate at end wall 18. Rib 16 is not flush with the plane of the end wall 18 for the entire circumference of pipe 10 at end wall 18 because the helical rib 16 advances incrementally along the longitudinal axis of pipe 10 with each turn around pipe 10. Each turn of rib 16 represents 360 degrees of angular extension of rib 16 about the longitudinal axis of pipe 10.

Figure 2:
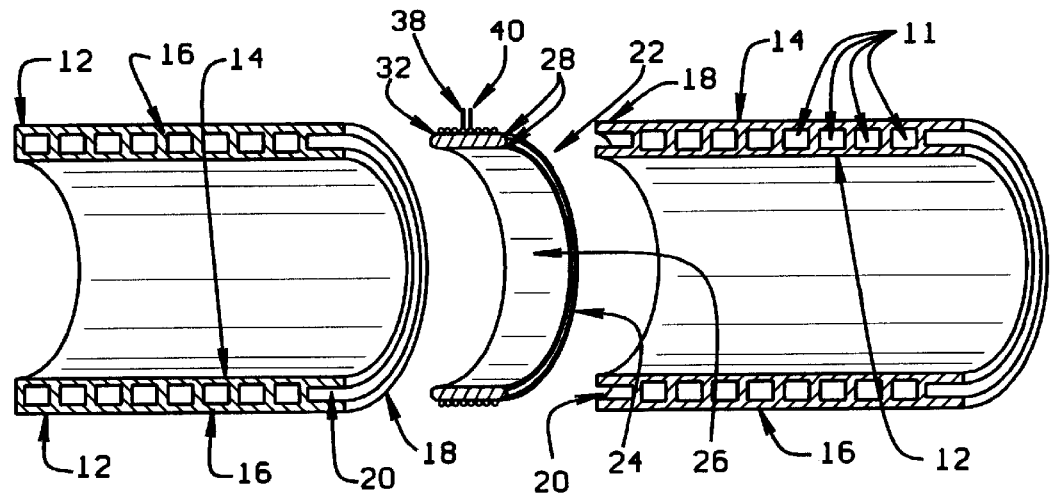
FIG. 2 is a cross sectional view of the two square profile wall pipes and the coupler therebetween prior to being joined.
Figure 10:
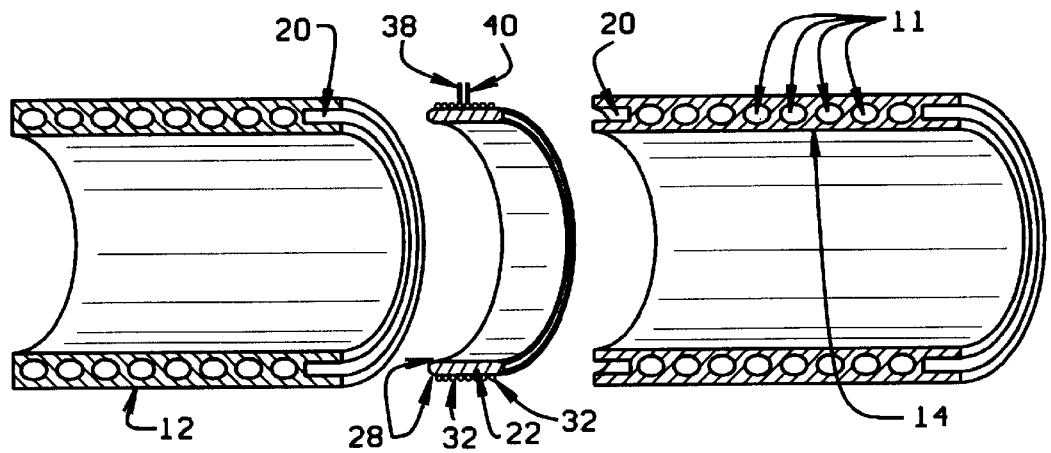
FIG. 10 is cross sectional view of two square profile wall pipes showing the coupler therebetween prior to being joined.

Profile space 11 is formed during the manufacture of profile wall pipe 10 and bordered on the exterior by outer wall 12, on the interior by inner wall 14 and on each side by rib 16. Profile space 11 can be square, as shown in FIG. 2 or round, as shown in FIG. 10, depending on the extrusion process. Either round or square profile pipe is acceptable for the parent invention.

Referring to FIG. 2, rib 16 advances along the longitudinal axis of pipe 10 as it traverses the length of pipe 10 and connects outer wall 12 and inner wall 14. In profile wall pipes, before application of the parent invention, the depth of profile space at an end of pipe 10, measured from the plane of end wall 18, increases along the circumference of end wall 18. The amount of increase in the depth of the profile space is a function of the longitudinal advance of rib 16 with each turn around pipe 10.

Shown in FIG. 2, endwall 18 of pipe 10 has a channel 20 formed therein for receiving coupler 22. Channel 20 is formed by removing a portion of rib 16 between outer wall 12 and inner wall 14. The amount of rib 16 which is removed depends on the desired depth of channel 20. The depth of channel 20 must be equal to or greater than a predetermined value which is dependent on the size of coupler 22 as described below. The depth of the channel 20 must equal or exceed the predetermined depth for the entire circumference of end wall 18.

Figure 3:
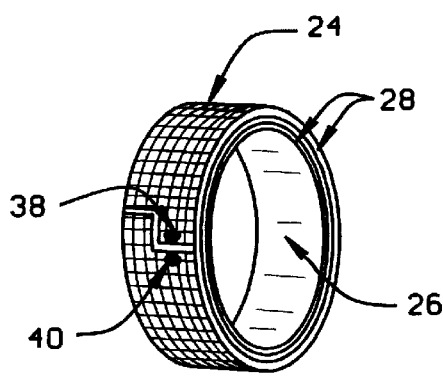
FIG. 3 is a perspective view of the coupler with the electrical resistance element placed thereon.
Figure 4:
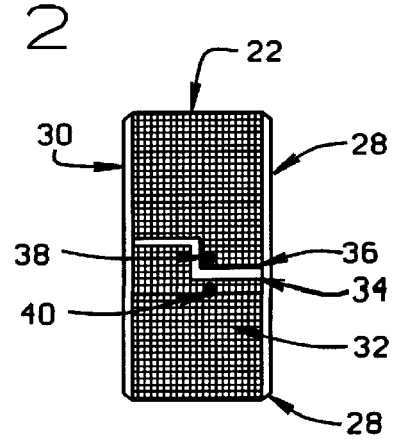
FIG. 4 is a side view of the coupler of FIG. 3.

Coupler 22, shown in FIG. 3, is an annular ring having an exterior surface 24 and an interior surface 26. Coupler 22 is configured with an inside diameter and an outside diameter to allow insertion of coupler 22 into channel 20. However, the configuration of coupler 22 must also allow mating of coupler exterior surface 24 with outer wall 12 of each pipe 10 and mating of coupler interior surface 26 with inner wall 14 of each pipe 10. Referring to FIG. 4, coupler 22 has an axial width, measured from edge 28 to edge 30, which is determined by the size of pipe to be joined. The depth of channel 20 (FIG. 2) must be equal or greater than ½ the width of coupler 22. Coupler 22 has a thickness, measured from exterior surface 24 to interior surface 26, which is approximately equal to the distance between inner wall 14 and outer wall 12 of each pipe 10. This allows for an interference fit of coupler 22 within channel 20 of each pipe. The edges 28 and 30 of coupler 22 are beveled or chamfered to facilitate insertion into channel 20.

Figure 5:
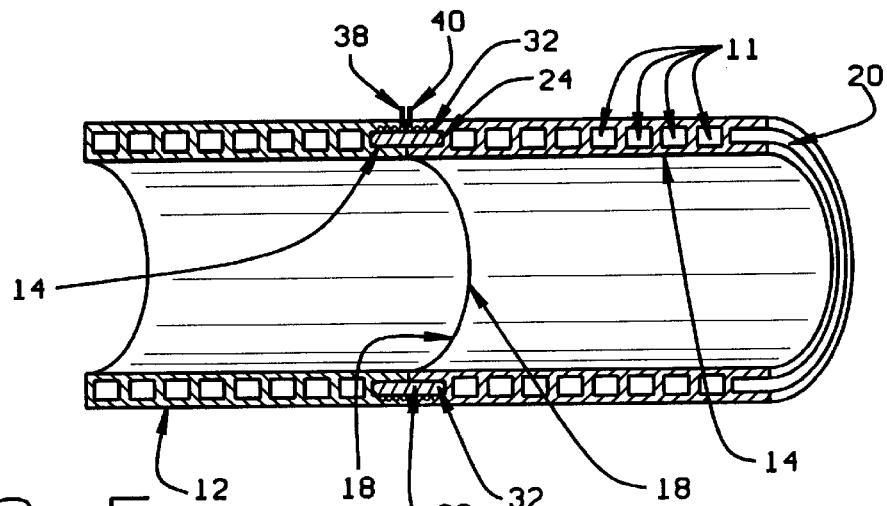
FIG. 5 is a cross sectional view of two square profile wall pipes united, end wall to end wall, with the coupler in the channel of each pipe.

Referring to FIG. 5, upon insertion of coupler 22 into channel 20 of each pipe 10, the end walls 18 of the pipes 10 should abut against one another to allow for a substantial flush pipe joint with a substantially continuous and flush inner wall and a substantially flush and continuous outer wall. As set forth above, a pipe joint with substantially flush inner and outer walls provides for a pipe joint which will not impede flow through the pipe nor impede insertion of the joined pipes in an existing culvert. The parent invention also allows the entire length of joined pipe to have a substantially uniform outside diameter and inside diameter which is not available in the prior art.

In the parent invention, two 10" inch inside diameter profile wall pipes were joined using a coupler having a width of approximately 3" inches. This resulted in a sufficient amount of mating surface to create a strong, uniform and water tight joint. The 3" inch coupler required a channel with a depth of at least 1½" inches in each pipe for receiving the coupler. As the diameter of pipes to be joined increases, the size and width of coupler also increases. For example, to join two 42" inch inside diameter pipes would required a coupler with approximately an 8" inch width.

Figure 6:
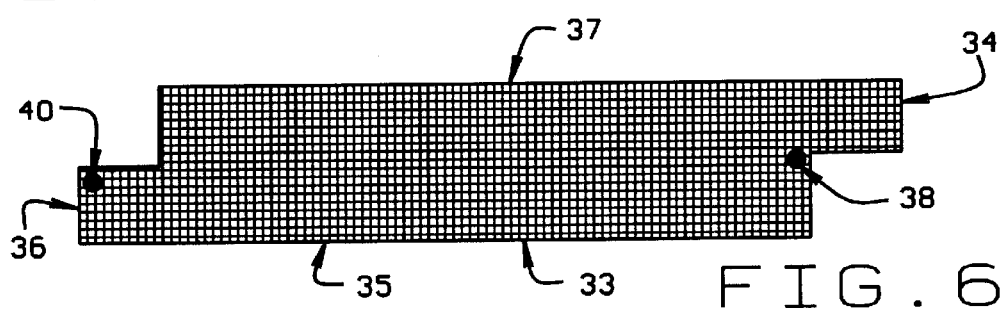
FIG. 6 shows a flat electrical resistance element screen prior to attachment to the coupler.

The thickness of the coupler is determined by the "profile" distance (the distance between the inner wall and outer wall) of the pipes to be joined. For example one manufacturer produces a polyethylene pipe with 10" inch inside diameter and an outside diameter of approximately 11.20 inches. The inner and outer wall thicknesses of this particular profile wall pipe range between 0.065" inches to 0.079" inches. Therefore, this particular pipe has a profile distance just over 1 inch, calculated by subtracting the sum of the inside diameter and the inner and outer wall thicknesses from the outside diameter. A 36" inch inside diameter profile wall pipe from the same manufacturer has a wall thickness of approximately 0.195 to 0.228 inches and an outside diameter of approximately 40.65 inches resulting in a profile distance between the inner and outer walls over 4 inches. Coupler 22 includes an electrical resistance element 32, shown in FIG. 5, to provide the heat required to fuse coupler 22 to inner wall 14 and outer wall 12 of pipes 10. The electrical resistance element of the parent, shown in FIG. 6 before attachment to coupler 22, is a stainless steel screen 33. Screen 33 has ends 34 and 36 with terminal pins 38 and 40 electrically connected thereto. Screen 33 also has a length, measured from end 34 to end 36 and width, measured from side 35 to side 37, sufficient to cover the exterior surface 24 of coupler 22.

Ends 34 and 36 are configured to allow overlap of end 34 with end 36 around the circumference without making contact therebetween. This prevents shorting the electrical resistance element 32 when it is energized and allows uniform heating over entire exterior surface 24 of coupler 22. Terminal pins 38 and 40 are located at opposite ends of screen 33 to provide for electrical connection of a power source (not shown) to screen 33 for energization of screen 33.

Figure 7:
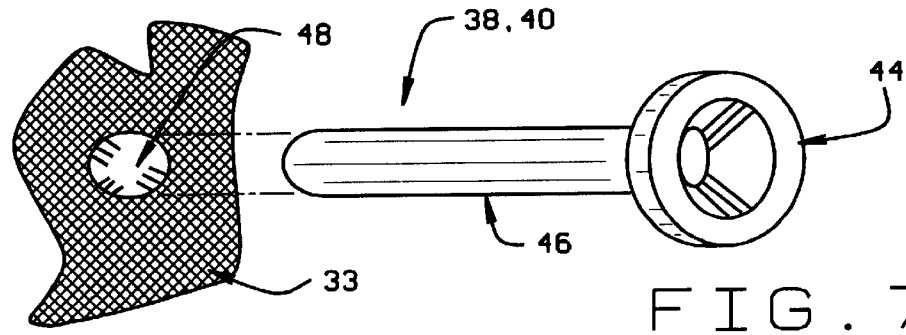
FIG. 7 is a perspective view of a terminal pin before insertion into the screen.

Terminal pins 38 and 40 are electrically connected to electrical resistance element 32. Terminal pins 38 and 40, shown in FIG. 7 before attachment to screen 33, have a base 44 and an extension 46. Base 44 has a larger circumference than extension 46 to allow extension to be inserted in an opening of screen 33 without pulling base 44 through opening 48. Terminal pins 38 and 40 may be made of any type of electrically conductive material such as copper or stainless steel but must be of sufficient gauge to allow transfer of enough electrical current to the electrical resistance element 32 as required to fuse the coupler 22 to channel 20.

Referring to FIG. 4, terminal pins 38 and 40 are attached to ends 34 and 36 and positioned to be aligned with the center of coupler 22, equidistant from sides 35 and 37, when screen 33 is wrapped around coupler 22. Terminal pins 38 and 40 are positioned in this fashion to protrude between abutted end walls 18 of pipes 10 to allow electrical connection of screen 33 in channel 20 to an external power source (not shown).

To energize screen 33, the power source (not shown) is connected across to terminal pins 38 and 40 of screen 33 by connecting the positive lead from the power source to one terminal, for example 38, and the negative lead from the power source to the second terminal, for example 40. As electrical current is run through screen 33, screen dissipates heat to coupler 22 and pipes 10. Referring to FIG. 5, after coupler 22 is inserted into channel 20, terminal pins 38 and 40 are connected to a power source (not shown), as described above, which supplies a predetermined amount of electrical current sufficient to heat electrical resistance element 32 and soften coupler 22 and the appropriate mating surface of the pipes. The interference fit between coupler 22 and pipe 10 develops sufficient bonding pressure as coupler 22 softens and expands causing pressure at the inner wall 14 and outer wall 12. Inner wall 14 and outer wall 12 also are heated from energization of electrical resistance element 32 and this produces a uniform and strong fusion bond between coupler 22 and pipes 10.

Electrical resistance element 32 is embedded into the exterior surface 24 of coupler 22. The electrical resistance element can also be attached to the interior surface 26 of coupler 22. In the alternative, electrical resistance element 32 can be embedded in inner wall 14 or outer wall 12 of the pipes. The exact location of electrical resistance element 32 is not critical as long as it is within sufficient proximity to both the coupler 22 and at least one pipe wall 12 or 14 so that upon energization of electrical resistance element 32, coupler 22 will be fused to pipes 10.

Electrical resistance element 32 is comprised of stainless steel screen 33. However, any electrically conductive material, such as wire, screen, mesh, or helical resistance wire, is acceptable provided upon energization it produces sufficient heat to fuse coupler 22 within channel 20 of each pipe. The use of screen 33 decreases the likelihood of an electrical short as often occurs with an electrical resistance element made of a single wire.

Figure 8:
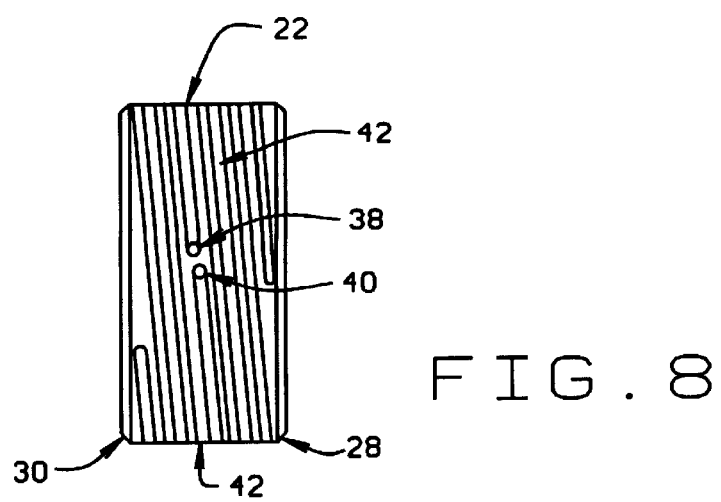
FIG. 8 is a direct view of a coupler with an electrical resistance element in the form of a helical wire wound around coupler.

For example, as shown in FIG. 8, electrical resistance element is formed by wrapping a single wire 42 in successive turns around coupler 22 toward each edge 28 and 30. During insertion of coupler 22 into channel 20, due to the required interference fit, one turn of single wire 42 could be forced into an adjacent turn of wire thereby shorting the circuit and preventing electricity from conducting past the short. This would result in only a portion of coupler 22 being fused to the pipes.

Electrical resistance element 32 is embedded into the exterior surface 24 of coupler 22. It is preferred that electrical resistance element 32 be sufficiently held on coupler 22 to prevent the electrical resistance element 32 from moving during the insertion of the coupler 22 into the channel 20 due to the interference fit between coupler 22 and channel 20. If a stronger joint is desired, a second electrical resistance element can be added to the interior surface 26 of coupler 22. Proper placement of electrical resistance element 32 in channel 20 provides for a continuous and uniform fusion weld at the joint.

Coupler 22 can be manufactured with electrical resistance element 32 embedded therein or the embedding can be accomplished in the field. In the manufacturing process, electrical resistance element 32 can be embedded using techniques known in the art currently used for manufacturing electrofusion collars or inserts. In the alternative, electrical resistance element 32 can be placed around the coupler 22 and covered with a like thermoplastic material. If electrical resistance element 32 is to be attached to inner wall 14 or outer wall 12 of pipe 10, the same techniques can be used when manufacturing the pipes to attach electrical resistance element in channel 20.

In the field, electrical resistance element 32 can be embedded into exterior surface 24 of coupler 22 by wrapping electrical resistance element 32 around coupler 22 and applying pressure to urge it into the exterior surface of coupler 22 while energizing electrical resistance element 32. The pressure can be applied using a clamp (not shown), or a binder (not shown) which can be shaped around coupler 22 and electrical resistance element 32.

FIG. 5 is a cross sectional view showing coupler 22 inserted in channel 20 joining the pipes 10 prior to energization of electrical resistance element 32. As is shown, end walls 18 of pipes 10 are abutting against one another and the exterior surface 24 of coupler 22 is adjacent the outer walls 12 of pipes 10. The interior surface 26 of the coupler 22 is adjacent the inner walls 14 of pipes 10. Electrofusion element 32 is positioned between exterior surface 24 and outer walls 12 of pipes 10. Terminal pins 38 and 40 extend between abutted end walls 18 to allow connection to power source (not shown). Any power source capable of supplying adequate power to the electrical resistance element is acceptable for the parent invention. For example, a variable current electrical welder is acceptable as are any type of power supplies used in the prior art for fusion welding of thermoplastic pipes using electrofusion collars and inserts. Preferably, an electrofusion control unit is used for the power source, as are known in the art, to furnish a predetermined amount of electrical current which is required to heat the screen 33 and partially melt exterior surface 24 of coupler 22 and inner wall 14 and outer wall 12 of pipes 10.

The coupler 22 expands during heating at a greater rate than the pipe walls due to the attachment of the electrical resistance element thereon. This develops additional internal bonding pressure to produce a fusion bond of adequate depth and continuity to form a pressure tight pipe joint, that is substantially flush with the pipe walls, leaving no interior flow restrictions or exterior collars or obstructions.

A variety of power sources exist in the art which will supply the correct amount of current for each pipe size. Existing electrofusion control units are capable of measuring heat levels and/or maintaining a measured welding time at a predetermined current to form a structurally sound leak-proof joint upon cooling.

However any experienced fusion welder with charts showing the recommended current and heating time for each size and composition of pipe, is capable of forming a leak-proof joint using any available, variable ampere, direct current welder, as a power source.

Figure 9:
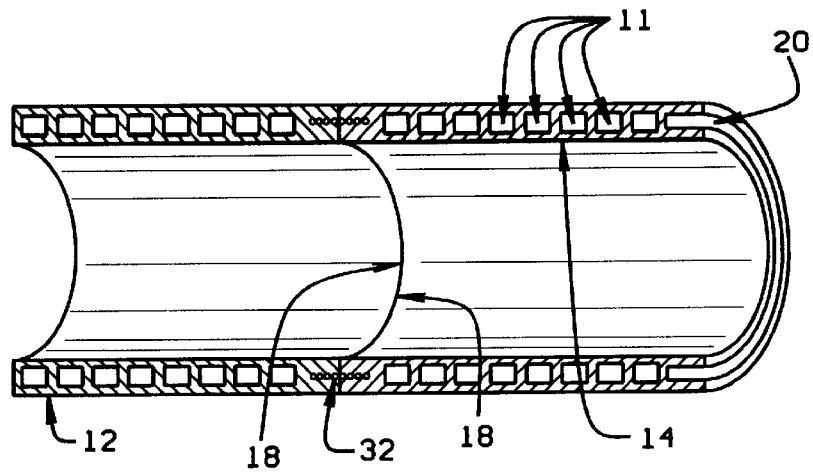
FIG. 9 is cross sectional view of two round profile wall pipes with the coupler between the pipe sections after being joined and electrofusion welded.

FIG. 9 shows a complete joint using the parent invention after screen 33 has been energized and the fusion weld is complete. As is shown, the parent invention results in a substantially flush joint both interior and exterior and a substantially uniform outside diameter and inside diameter throughout the length of the joined pipes.

Figure 11:
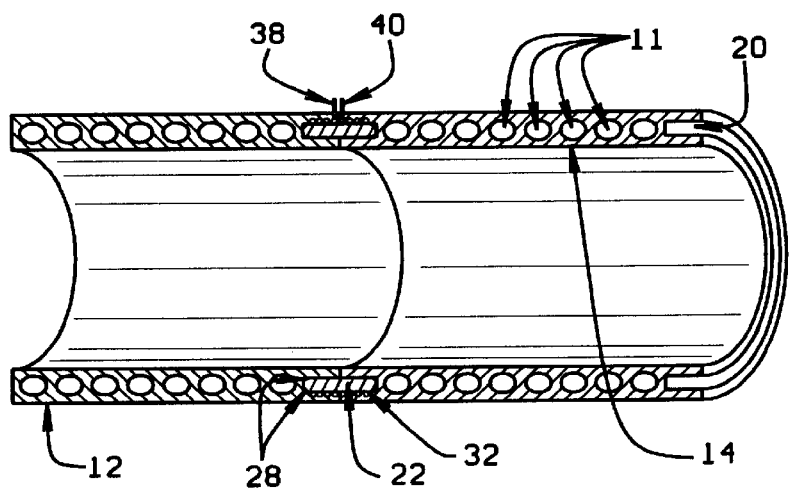
FIG. 11 is a cross sectional view of two round profile wall pipes showing the coupler between the pipe sections and in the channel of each pipe.
Figure 12:
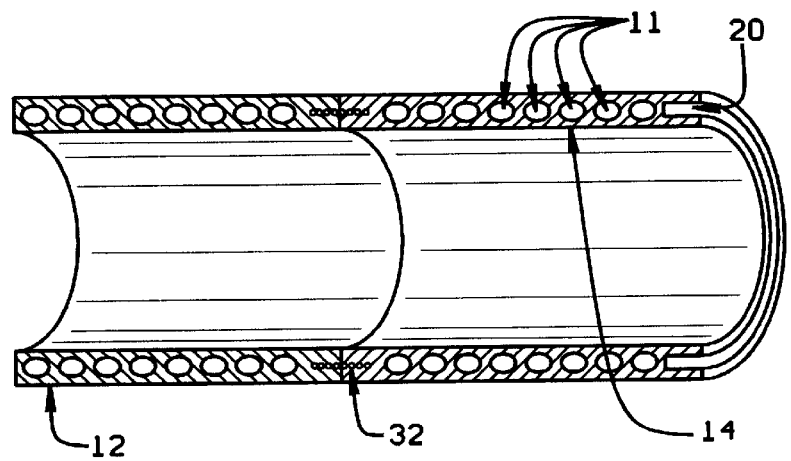
FIG. 12 is a cross sectional view of two round profile wall pipe sections after being joined and electrofusion welded.

FIGS. 10 through 12, show the first embodiment of the parent invention as described above. The only difference between these embodiments being the shape of the profile space 11 in the profile wall pipe used. The detailed description above is equally applicable to round profile wall pipe as discussed above with like numbers referring to like elements.

Having described the apparatus, a method for forming the pipe joint of the parent invention between two pipes is explained. As noted above, tie invention of the parent is particularly adapted for use with profile wall pipe, and produces a pipe joint with substantially flush interior and exterior surfaces. This method is equally applicable to solid wall thermoplastic pipe having a sufficient wall thickness to allow the formation of a channel 20 between an inner wall 14 and an outer wall 12. The method will be explained assuming profile wall pipe, however, the only requirement for the parent invention is that the pipe be capable of having a channel 20 at an end wall 18 for receiving a coupler 22 therein.

To practice the method of the parent invention, pipes 10 are modified to include a channel 20 in each end wall 18. This can be performed by routing or machining taking care not to remove inner wall 14 or outer wall 12 in the process. In profile wall pipe, the creation of channel 20 is made simpler by the lack of a solid wall at end walls 18. As stated above, profile wall pipe is manufactured having a profile space 11 formed by inner wall 14 outer wall 12 and rib 16. Therefore, at the end wall 18 of a section of profile wall pipe 10, profile space already exists prior to routing. However, removal of rib 16 is required in order to form channel 20 with a minimum depth the entire circumference of end wall 18.

The amount of rib 16 which must be removed is dependent upon the depth of channel 20 required, the size of rib 16 and the width of profile space 11. It is preferable to have the depth of channel 20 uniform, however, all that is required is that the shallowest segment of channel 20 be greater than or equal to 1/2 the width of coupler 22. After channel 20 is formed in end walls 18 of pipes 10, the coupler can be inserted into the channel.

Edges 28 and 30 of the coupler are beveled to easier insertion of coupler 22 into channel. In the preferred embodiment of the parent, electrical resistance element 32 is embedded into exterior surface 24 of coupler 22. If electrical resistance element 32 is not attached to coupler 22, this must be accomplished prior to insertion of coupler into pipe 20. An electrical resistance element, such as screen 33 is wrapped around exterior surface 24 of coupler 22. A clamp (not shown) or adjustable binder (not shown) is tightened over screen 33 urging screen 33 onto coupler 22. Terminal pins 38 and 40 should be aligned in the center of coupler 22 equidistant from edges 28 and 30. This allows the extension of terminal pins 38 and 40 to extend between abutment of end walls 18 after coupler 22 is inserted into channel 20 of each pipe 10 to be joined. To embed screen 33 into exterior surface 24 of coupler 22, power source (not shown) is electrically connected to terminal pins 38 and 40. A positive lead is attached to one terminal, for example 38 and the negative lead from power source is attached to other terminal pin, for example 40. Screen 33 is then energized by power source (not shown) causing electrical current to flow through screen 33. Screen 33 should be energized long enough to attach screen 33 sufficiently to coupler 22 to hold screen 33 in place during insertion of coupler 22 into channel 20. In the preferred embodiment of the parent, screen 33 is energized until coupler 22 begins to protrude through openings in screen 33.

After attachment of screen 33 to coupler, coupler is inserted into channel 20 of each channel 20. In the preferred embodiment of the parent, coupler 22 is inserted to a depth of one-half of its width into each pipe 10. This allows abutment of end walls 18 of each pipe 10 and provides an mating surface between coupler 22 and each pipe 10.

After coupler 22 is inserted into channel 20 of each pipe 10, screen 33 is energized, as described above by connecting power source to terminal pins 38 and 40. Screen should be energized for a sufficient duration to cause pipes 10 to be fusion welded to coupler 22. The amount of power and duration are determined by the types of thermoplastic material from which pipes 10 are made and the amount of heat necessary to create the fusion weld. As stated above, the amount of heat and power necessary is known in the art of electrofusion welding using electrofusion couplers and inserts.

A second embodiment of the parent invention for use on solid wall thermoplastic pipes is shown in FIGS. 13–17. A first solid wall pipe 50 and a second solid wall pipe 52 can be joined using the principles of the parent invention by modifying a first pipe end 54 and a second pipe end 56 for use with electrical resistance element 32. This embodiment of the parent creates a substantially flush interior and exterior pipe joint and a substantially uniform outside diameter and inside diameter. As shown, first pipe 50 and second pipe 52 have substantially equal outside diameters, substantially equal inside diameters and each has a substantially uniform circumference. First end 54 and second end 56 have substantially the same inside diameter and outside diameter as pipes 50 and 52.

The outside diameter of first end 54 is machined or shaved to form a male nipple 58. In order to allow for a pipe joint having a substantially flush interior and substantially flush exterior, nipple 58 is formed by decreasing outside diameter of first end 54 and thereby decreasing the wall thickness. At one end of nipple 58 is shoulder 61 where the nipple 58 meets the remainder of first pipe 50 and is formed by the difference in outside diameter between nipple 58 and first pipe 50. At the other end of nipple is nipple edge 60 which can be beveled or chamfered. Between nipple edge 60 and shoulder 61 is nipple exterior surface 74.

Figure 14:
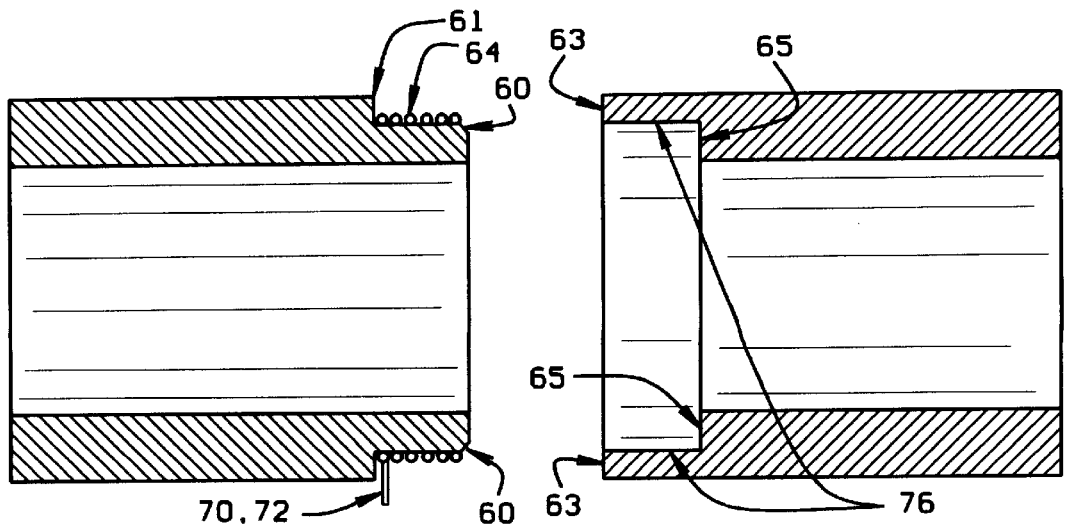
FIG. 14 is a direct view of two solid wall thermoplastic pipes adjacent to each other with the inside wall of one pipe having a nipple and one pipe having a socket.

The inside diameter of second end 56 is machined or shaved to form a female socket 62. In order to allow for a pipe joint having a substantially flush interior and substantially flush exterior, socket 62 is formed by increasing inside diameter of second end 56 and thereby decreasing the wall thickness. Referring to FIG. 14, one end of socket 62 is end wall 63 of second pipe 52 and at the other end of socket is lip 65 formed by the difference in inside diameter between second pipe 52 and socket 62. Between lip 65 and end wall 63 is socket interior surface 76.

The amount of decrease in wall thickness (and increase in inside diameter) of second end 56 is approximately equal to the decrease in wall thickness (and decrease in outside diameter) of first end 54. In the preferred embodiment of the parent, the wall thickness of both first end 54 and second end 56 are decreased by approximately one-half of the original wall thickness, however, any amount of decreased in wall thickness is acceptable provided the amount of decrease is equal in both first end 54 and second end 56 to provide a flush interior and exterior surface.

Figure 15:
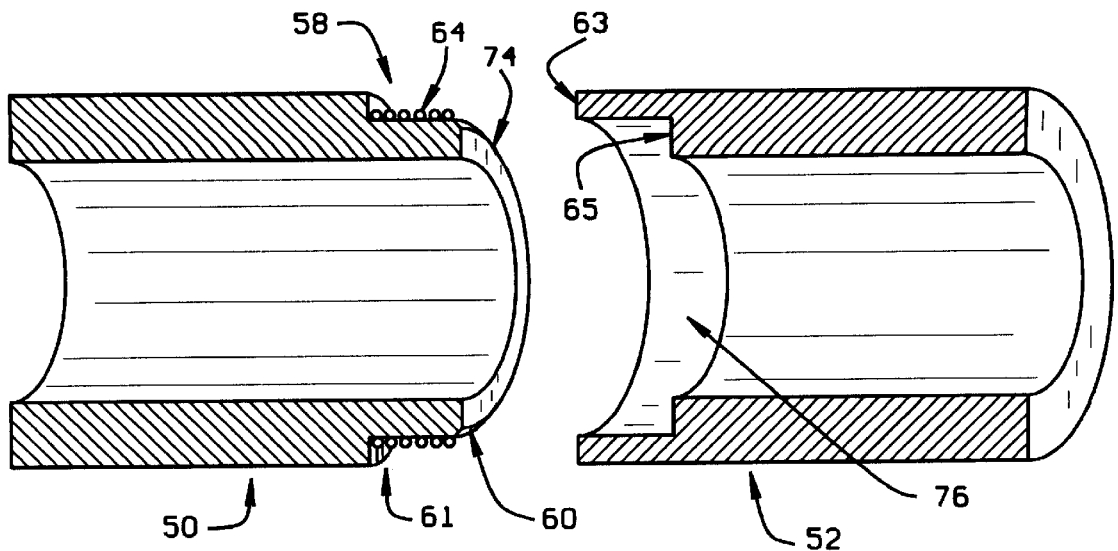
FIG. 15 is a perspective view of two solid wall thermoplastic pipes adjacent to each other with the inside wall of one pipe having a nipple and one pipe having a socket.

Referring to FIG. 15, the length of nipple 58, measured from shoulder 61 to the nipple edge 60, is equal to the depth of socket 62, measured from end wall 63 to lip 65. This allows the nipple 58 to have an interference fit within the socket 62 with the exterior surface 74 of the nipple 58 adjacent to interior surface 76 of socket 62, shoulder 61 of first pipe 50 abutted against end wall 63 of second pipe 52 and lip 65 of second pipe 52 abutted against nipple edge 60 of first pipe 50. The resulting joint having substantially flush interior and exterior and substantially uniform outside and inside diameters.

The nipple 58 has an electrical resistance element 64 embedded into the exterior surface 74 of the nipple. The electrical resistance element 64 is substantially identical to the electrical resistance element 32 of the embodiment discussed above except for the configuration of the ends 66 and 68 and location of the terminal pins 70 and 72. However, the composition and characteristics of the electrical resistance element 64 and the terminal pins 70 and 72 are identical to the electrical resistance element 32 and the terminal pins 38 and 40, respectively. Therefore, the discussion above relate thereto is equally applicable herein.

Figure 13:
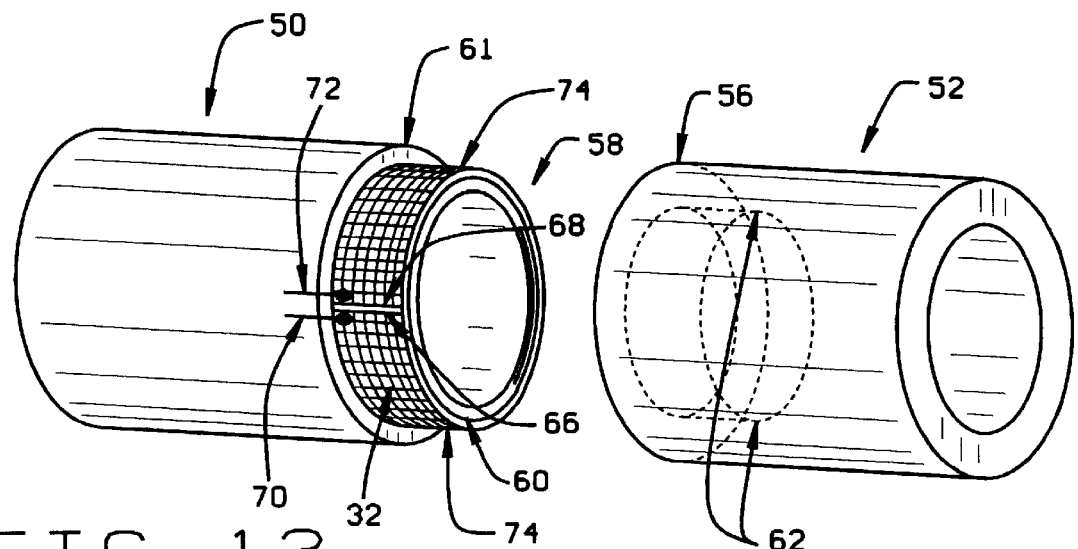
FIG. 13 is a dimensional view of two solid wall thermoplastic pipes adjacent to each other with the inside wall of one pipe having a nipple and one pipe having a socket.

As shown in FIG. 13, the electrical resistance element 64 has a length, measured between the ends 66 and 68, sufficient to substantially cover the exterior surface 74 of the nipple 58 and a width substantially equal to the length of nipple 58. Ends 66 and 68 are cut at the right angle to the length of the electrical resistance element and do not overlap. This allows extension of the terminal rins 70 and 72 between shoulder 61 of the first pipe 50 and the end wall 63 of the second pipe 52 for connection to power source (not shown).

The attachment of electrical resistance element 64 to the exterior surface 74 of the nipple 58 is identical to the attachment of electrical resistance element 32 to exterior surface 24 of coupler 22 described above. In the alternative, electrical resistance element 64 may be attached to interior surface 76 of socket 62. As set forth in detail above, electrical resistance element 64 should be sufficiently close to both the interior surface 74 and the exterior surface 76 to cause fusion of the socket 62 within nipple 58 on energization of electrical resistance element 64.

Figure 16:
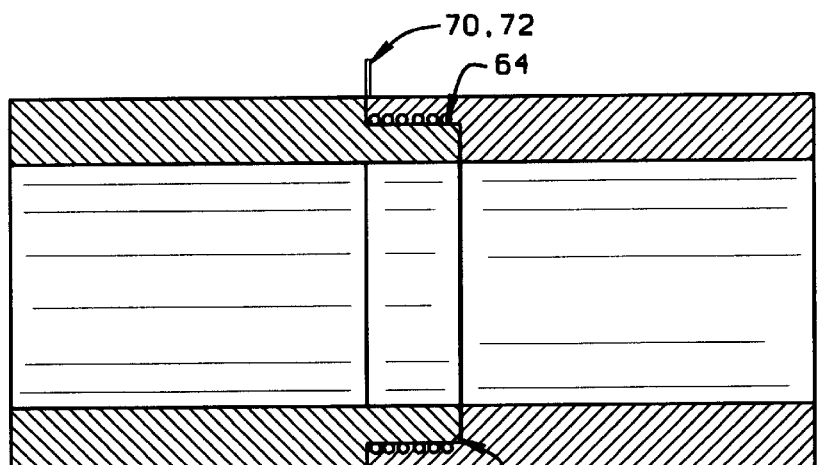
FIG. 16 is a cross sectional view of the two solid wall thermoplastic pipe sections of FIG. 15 after insertion of the nipple into the socket.

FIG. 16 shows the nipple 58 inserted within socket 62. As is shown, exterior surface 74 of the nipple 58 is adjacent the interior surface 76 of socket 62. The nipple edge 60 is abutted against the lip 65 and the end wall 63 is abutted against shoulder 61. The electrical resistance element 64 is embedded into the exterior surface 74 of the nipple 58 and is sufficiently close to the interior surface 76 of socket 62 to cause fusion of the nipple 58 to the socket 62 upon energization of the electrical resistance element 64. Terminal pins 70 and 72 extend between the abutted end wall 63 and the shoulder 61 to allow connection to power source (not shown).

Any power source capable of supplying adequate power to the electrical resistance element 64 is acceptable for the parent invention. For example, a variable current electrical welder is acceptable as are any type of power supplies used in the prior art for fusion welding of thermoplastic pipes using electrofusion collars and inserts.

Preferably, an electrofusion control unit is used for the power source, as are known in the art, to furnish a predetermined amount of electrical current which is required to heat the screen 78 and partially melt exterior surface 74 of the nipple 58 and the interior surface 76 of socket 62. The nipple 58 expands during heating at a greater rate than the interior surface 76 of the socket 62 due to the attachment of the electrical resistance element thereon. This develops additional internal bonding pressure to produce a fusion bond of adequate depth and continuity to form a pressure tight pipe joint, that is substantially flush with the pipe walls, leaving no interior flow restrictions or exterior collars or obstructions.

A variety of power sources exist in the art which will supply the correct amount of current for each pipe size. Existing electrofusion control units are capable of measuring heat levels and/or maintaining a measured welding time at a predetermined current to form a structurally sound leakproofjoint upon cooling. However any experienced fusion welder with charts showing the recommended current and heating time for each size and composition of pipe, is capable of forming a leak-proofjoint using any available, variable ampere, direct current welder, as a power source.

Figure 17:
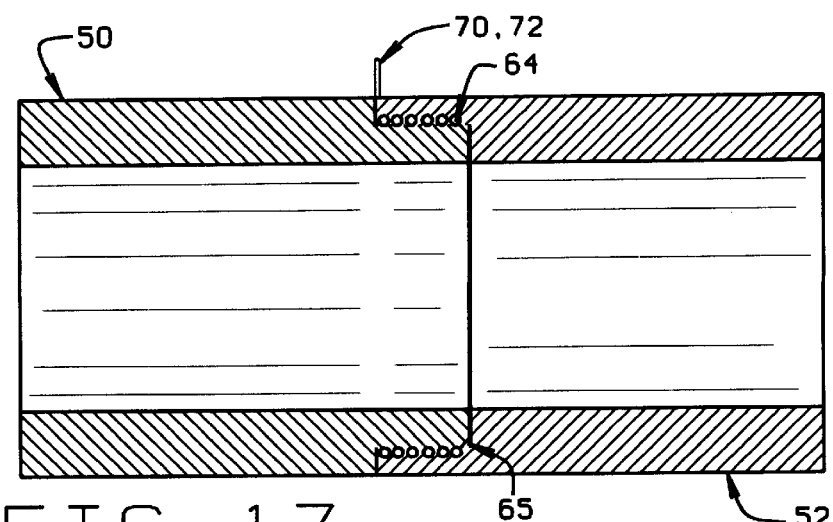
FIG. 17 is a cross sectional view of the two solid wall thermoplastic pipe sections of FIG. 16 after electrofusion welding.

FIG. 17 shows a complete joint using the parent invention after screen 78 has been energized and the fusion weld is complete. As is shown, the parent invention results in a substantially flush joint both interior and exterior and a substantially uniform outside diameter and inside diameter throughout the length of the joined pipes.

To practice the method of the parent invention, a first pipe 50 is modified at a first end 54 to form a nipple 58 and a second pipe 52 is modified to form a socket 62 for receiving nipple 58 therein.

First pipe 50 and second pipe 52 have substantially equal outside diameters, substantially equal inside diameters and each has a substantially uniform circumference. First end 54 and second end 56 have substantially the same inside diameter and outside diameter as pipes 50 and 52.

To form nipple 58 the outside diameter of first end 54 is machined or shaved by decreasing outside diameter of first end 54 and thereby decreasing the wall thickness. The inside diameter of second end 56 is machined or shaved to form a female socket 62 by increasing inside diameter of second end 56 and thereby decreasing the wall thickness.

The amount of decrease in wall thickness of second end 56 is approximately equal to the decrease in wall thickness of first end 54. The length of nipple 58, measured from shoulder 61 to nipple edge 60, is equal to the depth of socket 62, measured from end wall 63 to lip 65. This allows nipple 58 to have an interference fit within socket 62 with exterior surface 74 of nipple 58 adjacent to interior surface 76 of socket 62 and shoulder 61 of first pipe 50 to abut against lip 65 of second pipe 52. The resulting joint having substantially flush interior and exterior and substantially uniform outside and inside diameters.

After forming nipple 58 and socket 62, an electrical resistance element 64 is embedded into the exterior surface 74 of nipple 58. An electrical resistance element, such as screen 78 is wrapped around exterior surface 74 of nipple 58. A clamp (not shown) or adjustable binder (not shown) is tightened over screen 78 urging screen 78 onto nipple 58. Terminal pins 70 and 72 should be aligned adjacent shoulder 61. This allows the extension of terminal pins 70 and 72 to extend between abutment of end wall 63 and shoulder 61 after nipple 58 is fully inserted into socket 62.

To embed screen 78 into exterior surface 74 of nipple 78, power source (not shown) is electrically connected to terminal pins 70 and 72. A positive lead is attached to one terminal pin, for example 70 and the negative lead from power source is attached to other terminal pin, for example 72. Screen 78 is then energized by power source (not shown) causing electrical current to flow through screen 78. Screen should be energized long enough to attach screen 78 sufficiently to nipple 58 to hold screen 78 in place during insertion of nipple 58 into socket 62. Screen 78 is energized until nipple 58 begins to protrude through openings in screen 78.

After attachment of screen 78 to nipple 58, nipple 58 is inserted into socket 62. In the parent, nipple 58 is fully inserted into socket 62. This allows nipple edge 60 to abut lip 65 and shoulder 61 to abut end wall 63 and provides an mating surface between exterior surface 74 of nipple 58 and interior surface 76 of socket 62.

After nipple 58 of first pipe 50 is inserted into socket 62 of second pipe 52, screen 78 is energized, as described above by connecting power source to terminal pins 70 and 72. Screen 78 should be energized for a sufficient duration to cause nipple 58 to be fusion welded within socket 62. The amount of power and duration are determined by the types of thermoplastic material from which pipes are made and the amount of heat necessary to create the fusion weld. The amount of heat and power necessary is known in the art of electrofusion welding using electrofusion couplers and inserts.

Any power source capable of supplying adequate power to electrical resistance element 64 is acceptable for the parent invention. For example, a variable current electrical welder is acceptable as are any type of power supplies used in the prior art for fusion welding of thermoplastic pipes using electrofusion collars and inserts.

After inserting nipple 58 with electrical resistance element 64 attached thereto into socket 62, a predetermined amount of electrical current is applied to the terminal pins 70 and 72 and the thermoplastic material on the nipple 58 softens and expands as it melts into the socket 62 providing additional fusion pressure as the socket interior surface 76 softens to fuse the two pipe sections together with adequate depth and uniformity to make a leak free and strong pipe joint with no interior flow obstructions or exterior collar or protrusions. The joint is made without the use of butt fusion machines or line up equipment necessary to provide longitudinal pressure to join the two pipe sections as required in the prior art.

Improving on the invention of the parent, the inventor herein has further improved his invention by providing a method and apparatus to join thermoplastic profile wall pipes without being required to use the coupler of the parent application. Profile wall pipe sections could not be fusion welded together without such a coupler because, unlike solid wall pipe, routing the external and internal diameters of two profile wall pipe sections resulted in a void or uneven mating surfaces between the two pipes due to the configuration of profile wall pipe as explained above. This prevented a solid fusion weld with substantially flush interior and exterior surfaces, as is needed in applications explained above, without the use of the coupler of the parent or prior art collars or sleeves.

Although the invention of the parent is a valuable improvement over the prior art, and there are applications where the use of a coupler is desired or needed, the inventor herein has succeeded in further improving the invention of the parent by providing a pipe joint for thermoplastic profile wall pipes to create a pipe joint with a substantially flush interior and exterior, without the need of a coupler. As in the parent, the preferred embodiment discussed herein is described as adapting standard profile wall pipe to configure the ends of the first and second pipe to be joined. However, it should be understood that the pipe ends could be originally configured during manufacture in the manner described without departing from the invention. This adaptation can occur at the manufacturing stage or at a subsequent stage prior to installation. The method of removing the walls and/or rib can be any suitable means as known in the art such as routing, shaving, grinding, cutting or any equivalent means.

Figure 18:
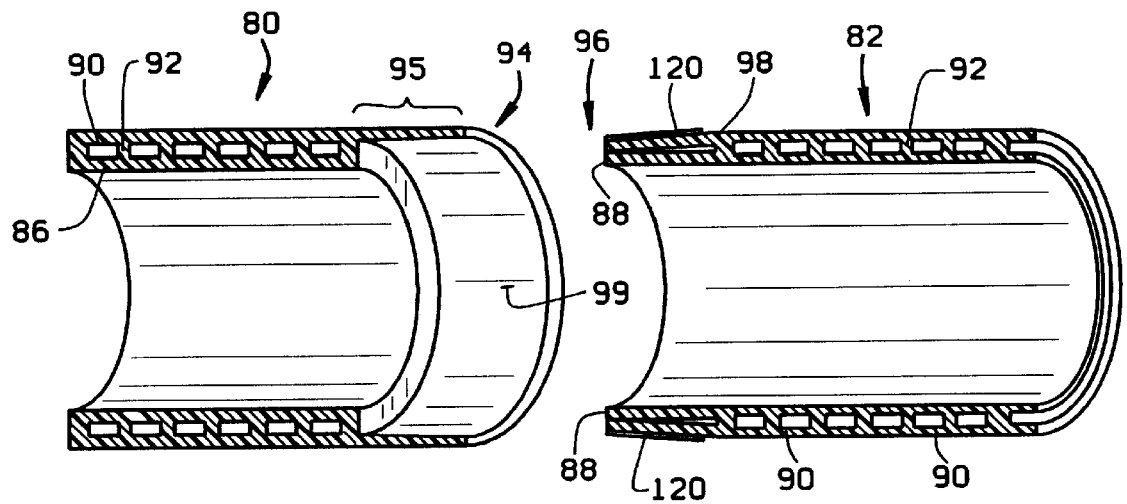
FIG. 18 shows a cross-sectional view of two profile wall pipes and an electrical resistance element, configured in accordance with one embodiment of the present invention, prior to being joined.
Figure 19:
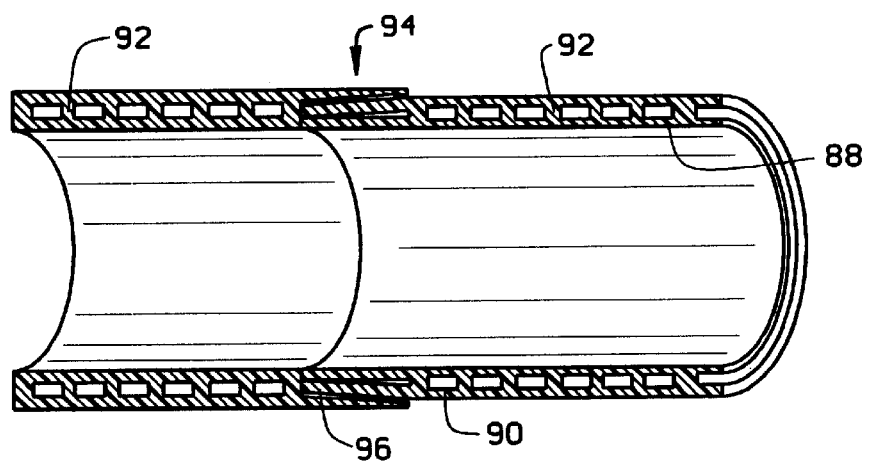
FIG. 19 shows a cross-sectional view of the profile wall pipes of FIG. 18 coupled together but prior to being fused with the electrical resistance element in place between the mating surfaces of the two pipes.
Figure 20:
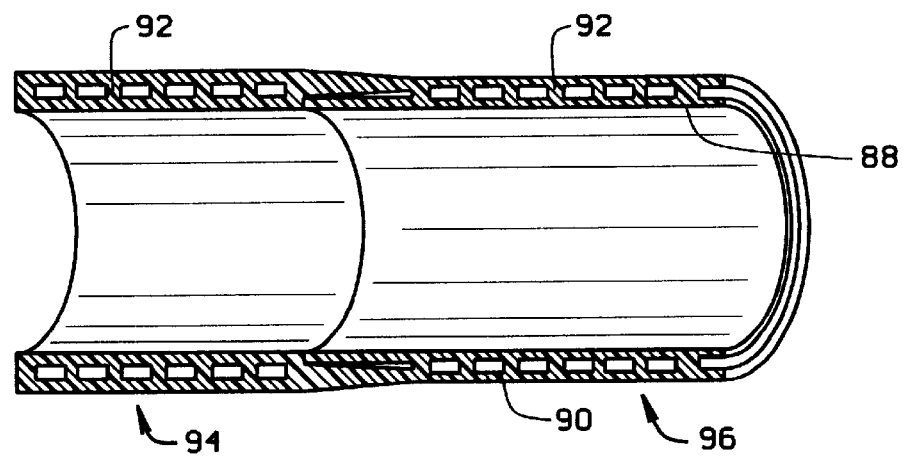
FIG. 20 shows a cross-sectional view of the profile wall pipes of FIG. 18 after being joined and fused to thereby form a pipe joint with substantially flush interior and exterior surfaces.

In one embodiment of the invention, the profile wall pipes 80 and 82 to be joined are configured or adapted and then coupled and fused together as shown in FIGS. 18–20. As shown in FIG. 18, a first pipe 80 is configured at an end 94 so that substantially all of the inner wall 86 and substantially all of the helical rib 92 are removed for a predetermined distance 95 from the first pipe end 94. The predetermined distance 95 can be varied to provide pipe joints of varying length and strength as desired. In this first embodiment, the second pipe 82 is adapted at an end 96 so that the second pipe end 96 can be coupled with the first pipe end 94 to thereby form an interference fit. As shown in FIG. 18, the second pipe end 96 is configured so that a portion of the helical rib 92 is removed for approximately the predetermined distance from the second pipe end 96, leaving the inner wall 88 and the outer wall 90 substantially intact. The portion of helical rib 92 is removed from the second pipe end for a distance approximately equal to the predetermined distance that the inner wall 86 and helical rib 92 were removed from the first pipe end 94.

Removing a portion of helical rib 92 for the predetermined distance from the second pipe end 96 increases the flexibility of the inner and outer walls 88 and 90 at the second pipe end 96. By decreasing the removed amount of helical rib 92 as the distance from the second pipe end 96 increases, the inner and outer walls 88 and 90 of the second pipe end 96 tend to "knuckle" or pull toward one another. This "knuckling" action tends to decrease the outer diameter of the second pipe at the second pipe end 96 and increase the inner diameter of the second pipe at the second pipe end 96, as compared to these diameters prior to the adaptation. Configured in this manner, the second pipe end 96 can be coupled to the first pipe end 94 by placing the second pipe end 96 within the first pipe end 94. This allows the second pipe end 96 to be coupled with the first pipe end 94, thereby creating an interference fit and providing for a mating surface on each pipe without the need for a coupler. The resulting pipe joint or weld assembly also provides a substantially flush interior and exterior surfaces.

Figure 21:
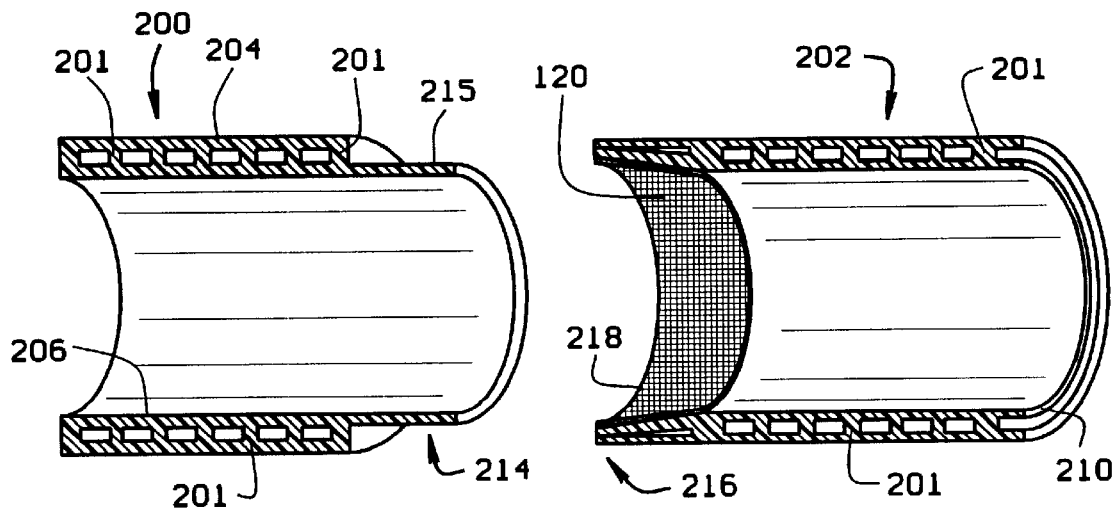
FIG. 21 shows a cross-sectional view of two profile wall pipes and an electrical resistance element, configured in accordance with a second embodiment of the present invention, prior to being joined.
Figure 22:
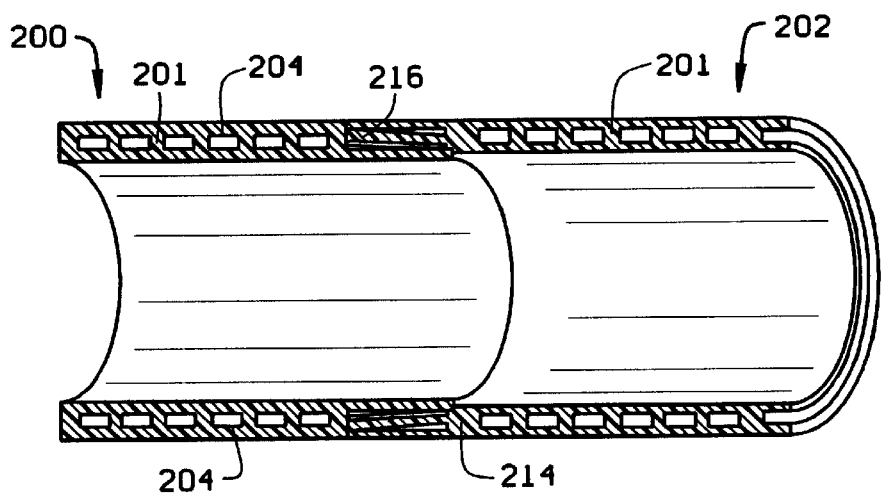
FIG. 22 shows a cross-sectional view of the two profile wall pipes of FIG. 21 coupled together but prior to being fused with the electrical resistance element in place between the mating surfaces of the two pipes.
Figure 23:
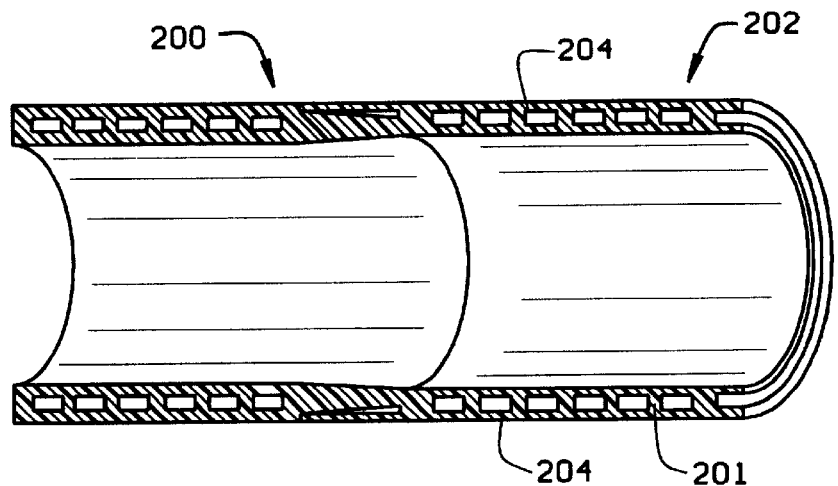
FIG. 23 shows a cross-sectional view of the two profile wall pipes of FIG. 21 after being joined and fused to thereby form a pipe joint with substantially flush interior and exterior surfaces.

In a second embodiment of the invention, the two profile wall pipes 200 and 202 to be joined are configured or adapted as shown in FIGS. 21–23. As with the first embodiment, an end of each of the two pipes to be joined must be configured or adapted to provide opposing mating surfaces to allow coupling of the pipes and provide a pipe joint with a substantially flush interior and exterior. In the second embodiment, a first profile wall pipe 200 is configured or adapted so that substantially all of the outer wall 204 and helical rib 201 is removed for a predetermined distance from the first pipe end 214. This predetermined distance can be varied to provide for pipe joints of varying length and strength. As in the first embodiment, the pipe can be adapted in the field or configured during manufacture in accordance with the present invention.

As in the first embodiment, in this second embodiment, an end 216 of the second pipe must be adapted so that the second pipe end 216 can be coupled with the first pipe end 214 to form an interference fit. The second pipe end 216 is adapted as discussed above with respect to the adaptation of the second pipe end 82 in the first embodiment. As in the first embodiment, the helical rib 201 is removed from the second pipe end for a length approximately equal to the distance that the outer wall 204 and helical rib 201 were removed from the first pipe end 214. Configured or adapted in this manner, the second pipe end 216 can then be coupled with the first pipe end 214 by placing the second pipe end 216 over the first pipe end 214 thereby creating an interference fit and providing for a mating surface on each pipe without the need for a coupler. The resulting pipe joint or weld assembly also provides a substantially flush interior and exterior surfaces.

As in the parent, once the pipes are coupled together, a heating mechanism is required to provide sufficient heat to cause the mating surfaces of the pipe ends to fuse together. Any suitable heating mechanism will work, all that is required is that sufficient heat be provided to cause the pipe ends' mating surfaces to fuse the pipes together. In both of the embodiments of the present invention shown herein, the heating mechanism is an electrical resistance element 120 which is placed within the pipe coupling or joint. The electrical resistance element can be anywhere within the pipe joint as long as it provides suitable heat to cause the pipe ends to fuse together. As disclosed in the parent, the pipes can be manufactured having the, electrical resistance element in place or the element can be added at the time of installation as explained in the parent and further explained below. In both embodiments discussed above, the electrical resistance element 120 is shown in FIGS. 18–23. If the electrical resistance element 120 is affixed after the pipes are manufactured, the element 120 should be affixed onto the appropriate mating surface prior to coupling the pipe ends.

In this first embodiment of the invention, shown in FIGS. 18–20, the electrical resistance element 120 can be fixed to the interior mating surface 99 of the outer wall 84 of the first pipe end 94 or on an exterior surface 98 of the second pipe end 96. In the second embodiment, shown in FIGS. 20–23, the electrical resistance element 120 can be placed on an exterior surface 215 of the interior wall at first pipe end 214 or on an interior surface 218 of the inner wall of the second pipe end 216, as shown in FIG. 21. Once coupled, the element is energized as explained below.

By configuring two standard thermoplastic profile wall pipes in either of the above-described embodiments, each pipe will thereupon be ready for coupling and then fusing to form a single length of thermoplastic profile wall piping having substantially flush interior and exterior surfaces.

Figure 24:
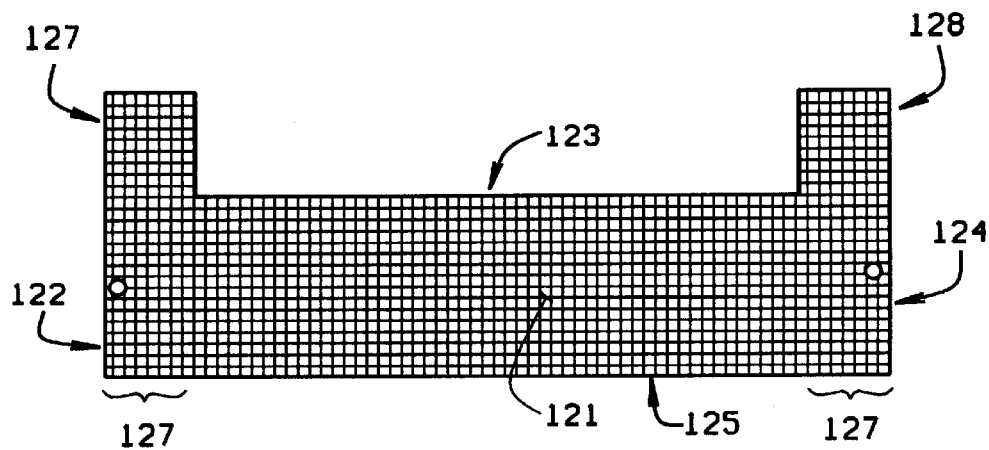
FIG. 24 shows an electrical resistance element of the present invention prior to attachment to a pipe.
Figure 25:
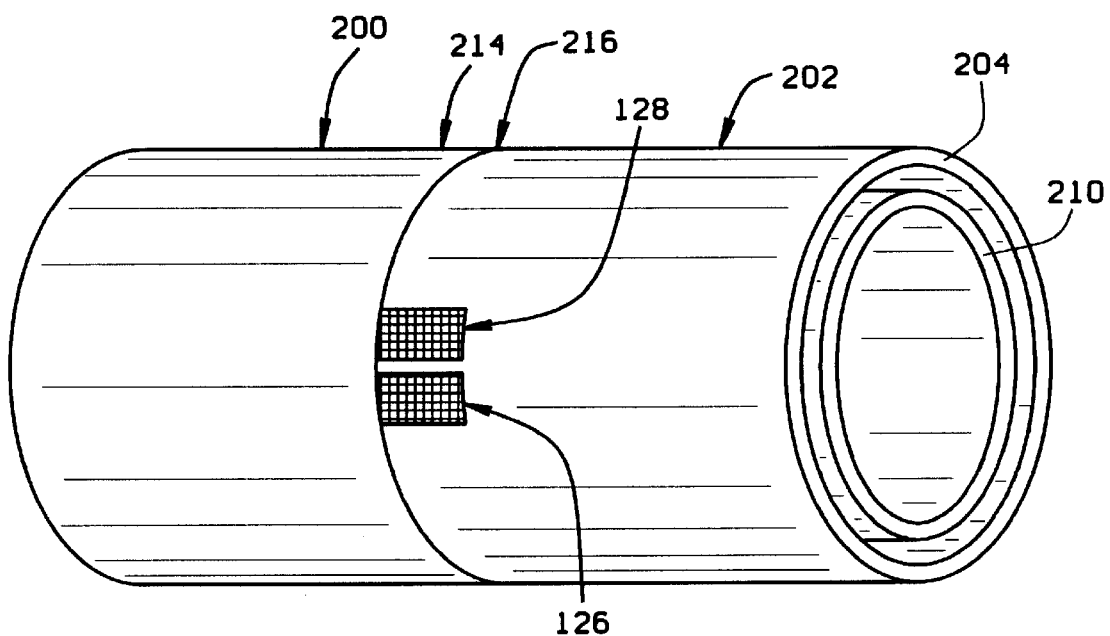
FIG. 25 shows a perspective view of two profile wall pipes after being coupled in acordance with the present invention with the terminal ends of the electrical resistance element extending from the pipe joint.

As in the parent, the electrical resistance element 120 shown in FIG. 24 of the preferred embodiment is comprised of stainless steel screen. In the preferred embodiment, this screen is comprised of stainless steel. However, any electrically conductive material such as wire, screen, mesh, or helical resistance wire, is acceptable provided that, upon energization, it produces sufficient heat to fuse together the coupled pipe ends. The electrical resistance element 120 is configured to allow two terminal portions 126 and 128 to protrude from the pipe joint after the pipe ends are coupled together as shown in FIG. 25. The shape of the electrical resistance element can vary as long as it can be energized after the pipe ends 214 and 216 are coupled together. This is accomplished in the preferred embodiment by configuring the element 120 to have two terminal portions 126 and 128 which can be attached to a power source (not shown) after the pipe ends 214 and 216 are coupled together. As shown in FIG. 25, the two terminal portions 126 and 128 of the electrical resistance element 120 protrude from the pipe joint even though the pipe ends substantially abut against one another after coupling. The amount of time and energy required to fuse the pipe ends together differs depending on the size of the pipe and the wall thickness as well as the specific material from which the pipes are made. In the preferred embodiment, the energy required is as was disclosed in the parent application. Enough heat must be generated to cause the pipes to fuse together.

The length of the electrical resistance element, as measured between screen edges 122 and 124, should be of a length that is sufficiently longer than the outer circumference of the pipe surface to which is it affixed. In so doing, the end margins 127 of the electrical resistance element 120 will overlap in place on the appropriate mating surface. The width of the central portion 121 of the electrical resistance element 120, as measured between screen sides 123 and 125, should be of a sufficient width to cover enough of the selected mating surface so that a strong fusion bond will be created upon energization of the electrical resistance element 120.

Protruding from the end portions 122 and 124 of the electrical resistance element 120 are the terminal portions or end margins 126 and 128. In the preferred embodiment, the terminal portions 126 and 128 are merely an extension of the screen ends. However, any electrically conducting element, such as copper or stainless steel, attached to the end portions of the electrical resistance element 120 is acceptable. In the preferred embodiment, the terminal portions are configured so as to be readily attached to the leads of a power source such as an electrical welder. As shown in FIG. 25, this allows the terminal portions 126 and 128 of the element 120 to protrude from the pipe coupling after the pipes have been joined. By extending the terminal portions beyond the coupling, a power source can be connected to energize the electrical resistance element 120. Also, the terminal portions must be of sufficient size to allow for the transference of a sufficient amount of electrical current to the electrical resistance element 120 to fuse the pipe ends together. As disclosed in the parent, any fusion welder a positive lead is attached to one terminal portion for example and the negative lead from power source is attached to other terminal portion. The electrical resistance element 120 is then energized by power source (not shown) causing electrical current to flow through element 120. The element should be energized long enough to cause the pipe ends to be fusion welded together. The amount of power and duration are determined by the types of thermoplastic material from which pipes are made and the amount of heat necessary to create the fusion weld. The amount of heat and power necessary is known in the art of electrofusion welding using electrofusion couplers and inserts.

Any power source capable of supplying adequate power to electrical resistance element 120 is acceptable for the present invention. For example, a variable current electrical welder is acceptable as are any type of power supplies used in the prior art for fusion welding of thermoplastic pipes using electrofusion collars and inserts.

In order to prevent the electrical resistance element 120 from shorting out due to the overlap of the ends of the electrical resistance element, the preferred embodiment also includes a thin sheet 130 of thermoplastic material, as shown in FIGS. 26 and 27, which is wrapped around and overlaps the exterior surface 137 of the electrical resistance element 120. By wrapping the thermoplastic sheet 130 around the exterior surface 137 of the electrical resistance element, the overlapping portions of the electrical resistance element 120 become electrically insulated from one another by the thermoplastic sheet 130. In the preferred embodiment, the thermoplastic sheet is made from the same type of thermoplastic material of the pipes to be joined to provide for consistency in the weld and the material. However, any suitable electrically insulating material can be used as long as it does not inhibit the fusion welding of the pipes. This thermoplastic sheet provides the necessary insulation to prevent an electrical short between the screen ends. By preventing such a short, the polyethylene sheet 130 allows the electrical resistance element 120 to provide uniform heating over the entire mating surface around which the electrical resistance element 120 is wrapped. The thickness of the thermoplastic sheet can be varied and will depend upon the material of which the sheet is made and the power to be used to cause the fusion weld as can be determined from appropriate charts and known in the art. The sheet must be thick enough to provide sufficient material to separate the end margins 127 radially when in place to prevent a short between the terminal portions but to allow the pipes to be fused together. Because the existence of the sheet adds material to the weld assembly, increasing the sheet thickness can provide for a more consistent weld.

Although only enough thermoplastic sheet is needed where the element overlaps, the inventor has found making the thermoplastic sheet approximately equal to the size of the element, that the thermoplastic sheet allows for a more consistent weld and eases the coupling of the pipes together by adding additional material into the fusion weld. In the preferred embodiment, the exterior surface of the electrical resistance element is wrapped with the thermoplastic sheet and bot are then wrapped around or placed into the selected mating surface. Thereafter, as in the parent, a clamp can be used to hold the combination in place on the mating surface while the element is energized for enough time and power to cause the combination to adhere to the selected mating surface while the pipes are coupled together, determined by charts and as is known in the art of electrofusion welding. The heat created upon the energization of the electrical resistance element 120 softens the thermoplastic sheet and the mating surface of the pipe end. By applying pressure to the electrical resistance element, the thermoplastic sheet adheres to the element and the electrical resistance element will be urged into the selected mating surface. The necessary pressure can be applied with a clamp (not shown), or a binder (not shown) which can be shaped around or into the selected mating surface and over the element and thermoplastic sheet. Upon the re-hardening of the pipe surface after the electrical resistance element is disconnected from its power source and cools down, the electrical resistance element and thermoplastic sheet are embedded into the surface of the pipe.

As shown in FIG. 25, the terminal portions 126 and 128 of the electrical resistance element should protrude from the coupling. A power source (not shown) can thereafter be connected across the terminal portions to energize the electrical resistance element. As the electrical resistance element is energized, it also heats up. As the electrical resistance element heats up, the interference fit between the first pipe end and the second pipe end develop sufficient bonding pressure as the mating surfaces soften and expand, causing pressure at the inner and outer walls of the mating surfaces. This produces a uniform and strong fusion bond between the two pipes. As shown in FIGS. 20 and 23, the end result is a singular length of thermoplastic profile wall pipe with a strong pipe joint that is substantially flush with the pipe walls, leaving no interior flow restrictions or exterior collars or obstructions.

It should be noted that any power source capable of supplying adequate power to the electrical resistance element is acceptable for the present invention. For example, a variable current electrical welder is acceptable as are any type of power supplies used in the prior art for the fusion welding of thermoplastic pipes. Preferably, an electrofusion control element is used for the power source to furnish a predetermined amount of electrical current necessary to heat and fuse the pipe ends. The amount of power and duration of power supply are determined by the types of thermoplastic material from which the pipes are made and the amount of heat therefore necessary to create the fusion weld. As stated above, the amount of heat and power necessary for such fusion is known in the art of electrofusion welding.

There are various changes and modifications that may be made to the invention as would be apparent to those skilled in the art. However, these changes or modifications are included in the teaching of the disclosure.

What is claimed is:

1. A coupling for uniting thermoplastic pipes, the coupling comprising:
    first and second thermoplastic pipes, each pipe having first and second concentric, radially spaced cylindrical walls and a helical rib joining the first and second walls;
    the first walls of both the first and second pipes being one of interior and exterior walls of the first and second pipes and the second walls of both the first and second pipes being the other of the interior and exterior walls of the first and second pipes;
    an end on the first pipe being devoid of substantially all of the helical rib and substantially all of the first wall for an axial distance at the end of the first pipe; and
    an end on the second pipe being devoid of a portion of the helical rib for an axial distance at the end of the second pipe, the second wall of the end of the second pipe being deflectable radially toward the first wall of the end of the second pipe to a position where the end of the first pipe can be telescopically coupled with the end of the second pipe with the second wall of the end of the first pipe positioned overlapping and engaging with the second wall of the end of the second pipe.

2. The coupling of claim 1 further comprising a heating mechanism positioned adjacent one of the first pipe and the second pipe where it can cause the second wall of the end of the first pipe and the second wall of the end of the second pipe to fuse to each other when the second wall of the end of the first pipe is positioned overlapping the second wall of the end of the second pipe.

3. The coupling of claim 2 wherein the heating mechanism is an electrical resistance element positioned annularly on one of the end of the first pipe and the end of the second pipe.

4. The coupling of claim 3 wherein the electrical resistance element is disposed radially between the second wall of the end of the second pipe and the second wall of the end of the first pipe when the second wall of the end of the first pipe is positioned overlapping the second wall of the end of the second pipe.

5. The coupling of claim 1 further comprising a portion of thermoplastic sheet disposed on one of the end of the first pipe and the end of the second pipe where it can fuse to both the second wall of the first pipe and the second wall of the second pipe when the second wall of the end of the first pipe is positioned overlapping the second wall of the end of the second pipe and heat is applied to the coupling.

6. The coupling of claim 5 wherein the thermoplastic sheet comprises the same material as the pipes.

7. The coupling of claim 1 wherein the second wall of the end of the first pipe is positioned overlapping the second wall of the end of the second pipe.

8. The coupling of claim 7 wherein the second wall of the end of the first pipe is engaged with the second wall of the end of the second pipe.

9. The coupling of claim 7 wherein the second wall of the end of the second pipe is heat fused to the second wall of the end of the first pipe.

10. The coupling of claim 7 further comprising an electrical resistance element, at least a portion the electrical resistance element being disposed between the second wall of the end of the second pipe and the second wall of the end of the first pipe, the electrical resistance element being adapted to provide sufficient heat to melt second wall of the end of the first pipe to the second wall of the end of the second pipe.

11. The coupling of claim 10 further comprising a portion of a thermoplastic sheet disposed between the second wall of the end of the first pipe and the second wall of the end of the second pipe where it can fuse to both the second wall of the end of the first pipe and the second wall of the end of the second pipe when the heat is applied by the electrical resistance element.

12. The coupling of claim 11 wherein the thennoplastic sheet comprises the same material as the pipes.

13. The coupling of claim 7 wherein the first walls of both the first and second pipes are interior walls of the first and second pipes and the second walls of both the first and second pines are exterior walls of the first and second pipes.

14. The coupling of claim 13 wherein the end of the second pipe is fused to the end of the first pipe by applying sufficient heat to the coupling to melt the exterior wall of the end of the first pipe to the exterior wall of the end of the second pipe.

15. The coupling of claim 13 further comprising an electrical resistance element, at least a portion the electrical resistance element being disposed between the exterior wall of the end of the second pipe and the exterior wall of the end of the first pipe, the electrical resistance element being adapted to provide sufficient heat to melt the exterior wall of the end of the first pipe to the exterior wall of the end of the second pipe.

16. The coupling of claim 15 further comprising a portion of a thermoplastic sheet disposed between the exterior wall of the end of the second pipe and the exterior wall of the end of the first pipe where it can fuse to both the exterior wall of the end of the first pipe and the exterior wall of the end of the second pipe when the heat is applied by the electrical resistance element.

17. The coupling of claim 16 wherein the thermoplastic sheet comprises the same material as the pipes.

18. The coupling of claim 13 wherein the exterior wall of the end of the first pipe is flared radially outward.

19. The coupling of claim 1 wherein the axial distance of the end of the first pipe is equal to the axial distance of the end of the second pipe.

20. The coupling of claim 1 wherein the first wall of both the first and second pipes are interior walls of the first and second pipes and the second wall of both the first and second pipes are exterior walls of the first and second pipes.

* * * * *